(12) United States Patent
Moreno

(10) Patent No.: US 8,780,787 B2
(45) Date of Patent: Jul. 15, 2014

(54) SYSTEM AND METHOD FOR CANCELING CO-CHANNEL INTERFERENCE ON-BOARD A SATELLITE

(75) Inventor: Daniel Moreno, Washington, DC (US)

(73) Assignee: Intelsat Corporation, Washington, DC (US)

( * ) Notice: Subject to any disclaimer, the term of this patent is extended or adjusted under 35 U.S.C. 154(b) by 0 days.

(21) Appl. No.: 13/979,321

(22) PCT Filed: Sep. 12, 2012

(86) PCT No.: PCT/US2012/054821
§ 371 (c)(1),
(2), (4) Date: Jul. 11, 2013

(87) PCT Pub. No.: WO2013/040011
PCT Pub. Date: Mar. 21, 2013

(65) Prior Publication Data
US 2013/0303080 A1    Nov. 14, 2013

Related U.S. Application Data

(60) Provisional application No. 61/533,465, filed on Sep. 12, 2011.

(51) Int. Cl.
*H04B 7/185* (2006.01)

(52) U.S. Cl.
USPC .... 370/317; 455/63.1; 455/67.13; 455/114.2; 455/296

(58) Field of Classification Search
CPC ...... H04B 7/04; H04B 7/18519; H04B 15/00; H04J 11/004
USPC ........... 455/63.1, 67.13, 114.2, 296; 370/317
See application file for complete search history.

(56) References Cited

U.S. PATENT DOCUMENTS

| | | | |
|---|---|---|---|
| 7,817,967 B2 | 10/2010 | Karabinis et al. | |
| 8,010,043 B2 | 8/2011 | Miller | |
| 2005/0136836 A1 | 6/2005 | Karabinis et al. | |
| 2010/0184370 A1 | 7/2010 | Zheng et al. | |
| 2010/0221997 A1 | 9/2010 | Craig et al. | |

OTHER PUBLICATIONS

International Search Report for PCT/US2012/054821 dated Dec. 7, 2012.

*Primary Examiner* — Raymond Dean
(74) *Attorney, Agent, or Firm* — Sughrue Mion, PLLC

(57) ABSTRACT

Provided are systems and methods for minimizing co-channel interference on-board a satellite. An up-link signal received by the satellite is post-compensated, where the up-link signal includes a desired signal transmitted by a first transmitter and an interfering signal transmitted by a second transmitter. The post-compensating includes identifying the interfering signal based on post-compensation parameters. In addition, a down-link signal to be transmitted from the satellite to a receiver is pre-compensated. The pre-compensation process includes determining gain relations between a gain of a first satellite antenna which transmits the down-link in a direction of the receiver and a gain of a second satellite antenna which transmits an interfering signal in the direction of the receiver, sampling and scaling interfering signals at the satellite based on the gain relations, and estimating a co-channel down-link interference component that the down-link signal is expected to experience on a path to the receiver.

28 Claims, 15 Drawing Sheets

POST-COMPENSATION OR UP-LINK CO-CHANNEL INTERFERENCE CANCELLER

SYSTEM AND METHOD FOR CANCELING CO-CHANNEL INTERFERENCE ON-BOARD A SATELLITE

CROSS-REFERENCE TO RELATED PATENT APPLICATION

This application is a National Stage of International Application No. PCT/US2012/054821, claiming priority from U.S. Provisional Application No. 61/533,465 filed on Sep. 12, 2011, the disclosures of which are incorporated herein by reference in their entirety.

BACKGROUND

1. Technical Field

The present invention relates to systems and methods for minimizing co-channel interference in signals sent to or received from a satellite, and more particularly, to systems and methods for reducing the co-channel interference on-board a satellite.

2. Description of the Related Art

It is commonplace for communications satellites to receive and transmit signals from and to ground stations in a number of different beam coverage areas, while utilizing the same uplink and/or downlink frequencies. Such frequency reuse schemes (e.g., using different polarization or spatial/geographic isolation) increase the overall satellite capacity, as measured by the throughput data rate in bits per second, but also introduce co-channel interference between the signals in the various beams.

The co-channel interference is evident between beams with identical polarization but it is also present between beams with opposite polarization (cross-polarization). The co-channel interference varies with the number of beams that share the same frequency band and the isolation between beams, as well as the relative location of transmit and receive earth stations with reference to the centers of the corresponding satellite beams. The co-channel interference also depends on the relative power between the carriers transmitted in the different beams.

In the related art, the antennas of the traditional communications satellites are designed in such a way that co-channel interference is in the order of 22 dB, thereby allowing the operation of carriers with signal to noise ratios (SNR) of up to 20 dB. Two methods are used to achieve this goal: 'Spatial Isolation' where, the beams serve different geographical regions as shown in FIG. 1A; and 'Polarization Isolation' where beams that could serve similar areas uses opposite polarization as shown in FIG. 1B. In the first method, in general, the isolation between beam centers is better than 27 dB. In the second method the polarization isolation of the satellite and the terrestrial antennas plays an important role minimizing the co-channel interference. In general the polarization isolation of the satellite antennas is better than 27 dB while the polarization isolation of the terrestrial antennas varies but it is recommended to be better than 26 dB.

If the isolation between beams is reduced due to a reduction of the geographical distance between beams or use of satellite antennas with less isolation, the corresponding SNR is likely to be reduced due to the increase in co-channel interference. Consequently, either the link quality is degraded or the throughput (typically expressed in bits per second, bps) transmitted through the satellite link is reduced. In other words, the bandwidth efficiency is reduced (bandwidth efficiency typically expressed in bps per Hertz, bps/Hz).

As an example of geographic/spatial frequency reuse in related art satellites, one beam might cover the Western Hemisphere (WH, e.g., the Americas) and another beam, using the same frequency range might cover the Eastern Hemisphere (EH e.g., Europe and Africa), a shown in FIG. 1A. As shown in FIG. 1A, the frequency plan in this scenario uses the same frequency and same frequency bands of 72 MHz as well as the same polarization (Pol. A) for both beams for up-link and down-link signals, since the beams are spatially isolated. An example of the polarization isolation frequency reuse in related art satellites is shown in FIG. 1B. As shown, the beam for the North East Zone (NEZ) serves an area similar to the beam for the Eastern Hemisphere (EH). Therefore, as shown in the frequency plan, both beams use the same frequency and same frequency bands of 72 MHz but use opposite polarization for up-link and down-link signals. In particular, the beam for the EH uses Pol. A, whereas the beam for the NEZ uses Pol. B.

When beams use linear polarization covering similar areas, the polarization isolation is achieved by using horizontal and vertical polarizations on each respective beam. Instead, if the beams use circular polarization, the polarization isolation is achieved using right and left hand polarizations.

Although FIGS. 1A and 1B show traditional bent-pipe satellites implementing "Spatial Isolation" and "Polarization Isolation" to minimize co-channel interference, the "Spatial Isolation" and "Polarization Isolation" techniques could also be implemented in on-board processing satellite. As understood by a skilled artisan, the traditional bent-pipe satellites receive signals from earth station, amplify the received signals and if necessary, shift the uplink frequency to a downlink frequency, and transmit the amplified (and possibly shifted) signal to an earth station. On the other hand, in-board processing satellites, the received signal is demodulated, decoded, re-encoded, and modulated before being transmitted to an earth station.

The ability to advantageously exploit geographic (spatial) frequency re-use is limited by various factors including the distance between the beam centers, the beam gain roll off with distance from the center of one beam towards another co-frequency beam, and the number of co-frequency beams. These factors are a function of the satellite antenna design and quality. An additional factor is the level difference of the signals transmitted in the different beams from the earth stations (uplink case) or from the satellite (downlink case, also referred to below as down-link case). As an example consider the case where two earth stations transmitting on the same frequency, one in Cape Town transmitting to the Eastern Hemisphere Beam and the other in New York transmitting to the Western Hemisphere Beam. If the isolation between the two beams for the stations at New York and Cape Town is 26 dB and the two stations are transmitting at the same level, the uplink co-channel interference ratio would be 26 dB. However, if the New York station were to increase its uplink level by 6 dB then the effective uplink co-channel isolation at Cape Town would be reduced by 6 dB to 20 dB resulting in a co-channel interference ratio of 20 dB. In related art satellite designs there could be 4 to 6 beams that are co-channel or beams reusing the same frequency band. So the uplink levels of earth stations transmitting to the additional two to four beams would have to be taken into consideration in this example.

In the newer related art satellite designs employing multiple circular spot beams (called multi-spot) as shown in FIG. 2, there can be forty or more beams, on the order of ten of which are co-channel, covering areas with diameters of only a few hundred miles. FIG. 2 illustrates four circular spot beams 1-4. As shown in the frequency plan, all four beams 1-4 use the same frequency and same frequency bands of 250 MHz for up-link and down-link signals, but beams 1 and 3 use Pol. A, whereas beams 2 and 4 use Pol. B to achieve polarization isolation. For these satellites the beam isolation provided by the satellite antenna alone may not always be sufficient to obtain the desired beam to beam isolation—In addition, uplink level differences for earth stations transmitting in nine or more beams must be considered.

The spatial isolation and the polarization isolation methods utilized in the traditional satellites that support open networks architecture to minimize the impact of the co-channel interference limit the number of beams, and as a consequence limit the total satellite throughput capacity. In general, a traditional satellite will reuse frequencies and polarizations two or three times to achieve a total useful bandwidth between 2 and 3 GHz. Some satellites that support closed-network architecture use a large number of beams (multi-beams) but there is an associated network management system that assigns the carriers' frequencies, interleaving them to reduce the co-channel interference. This solution also limits the total satellite capacity because, in this case, when one carrier operates at a given frequency in one beam other carriers at the same frequency in the co-channel beams are not allowed to operate. As a consequence, some of the satellite resources need to be available all the time but are rarely used. This type of satellite typically has 20 GHz of equipped bandwidth, but the useful bandwidth is reduced to 12 or 14 GHz at a given time due to interleaved managed operation.

The discussion so far has focused mainly on the uplink case. The same considerations apply to the downlink; when co-channel interference is introduced in the downlink signals, i.e., the signals transmitted from the satellite to the ground stations, the achievable received SNR at the receiver ground station for a given downlink signal is lowered.

SUMMARY

One of the objectives of the present application is to introduce methods and systems which allow satellites that support open-network architecture to reuse frequencies in a large number of beams by reducing the co-channel interference between the co-frequency carriers. More than 25 GHz of useful available capacity and more efficient utilization of the satellite's resources are expected for future satellites implementing multi-spot beams and the disclosed methods and systems supporting open-network architecture. Satellites designed to support open network architecture are able to operate with different technologies and terrestrial equipment, whereas the satellites designed to support managed close-network architecture are designed to uses specific techniques and specifics terrestrial equipment.

Embodiments of the disclosed systems and methods help minimize, using equipment and signal processing on-board a satellite, co-channel interference in signals received at the satellite or signals to be transmitted from the satellite. The co-channel interference is minimized while still allowing for the reduction of the geographic distance between beams or degradation of the satellite antenna quality or a combination of both. This, in turn, results in increased link capacity per satellite and/or the ability to reduce the satellite and/or earth station beam isolation requirements.

According to an aspect of the present invention, there is provided a method for minimizing co-channel interference on-board a satellite. The method includes post-compensating of an up-link signal received by the satellite. The up-link signal includes a desired signal transmitted by a first transmitter and an interfering signal transmitted by a second transmitter. The post-compensating process includes identifying the interfering signal based on post-compensation parameters including locations of the first transmitter and the second transmitter, carrier power levels of the desired signal and the interfering signal, and satellite antenna characteristics.

The post-compensation process can include determining gain relations between a satellite receiver antenna gain in a direction of the first transmitter and a satellite receiver antenna gain in a direction of the second transmitter, sampling and scaling the interfering signal at the satellite based on the determined gain relations, and estimating, based on the sampled and scaled interfering signal, a co-channel up-link interference component in the up-link signal.

The post-compensation process can further include subtracting the estimated co-channel up-link interference component from the up-link signal.

The pro-compensation process can further include multiplying a weight factor associated with the estimated co-channel up-link interference component with the up-link signal.

The post-compensated up-link signal is represented by $$Z_1(t) = [\text{Delta}R/R_{22}] \cdot Y(t),$$

where $\text{Delta}R = (R_{11} \cdot R_2 - R_2 \cdot R_{21})$, $Y_1(t)$ is the desired signal transmitted by the first transmitter, $Y_2(t)$ is the interfering signal transmitted by the second transmitter, R11 is the satellite receiver antenna gain in the direction of the first transmitter, R12 is the satellite receiver antenna gain in the direction of the second transmitter, R22 is an antenna gain of another satellite receiver in the direction of the second satellite, and R21 is an antenna gain of the other satellite receiver in the direction of the first satellite.

The post-compensation parameters are stored in a database, wherein the post-compensation parameters are dynamically updated in response to changes in terrestrial networks, satellite configuration, or in carrier operational parameters.

According to another aspect of the present invention, there is provided a method for minimizing co-channel interference on-board a satellite. The method includes pro-compensating of a down-link signal to be transmitted from the satellite to a receiver. The down-link signal is transmitted from a first satellite transmitter antenna and an interfering signal, which interferes with the down-link signal, transmitted from a second satellite antenna transmitter. The pro-compensation process can include determining gain relations between at least two different satellite transmitter antenna gains in a direction of the receiver, sampling and scaling interfering signals at the satellite based on the determined gain relations; and estimating a co-channel down-link interference component that the down-link signal is expected to experience on a path to the receiver.

The pr-compensation process can further include subtracting the estimated co-channel downlink interference component from the down-link signal.

The pr-compensation process can further include multiplying a weight factor associated with the estimated c-channel downlink interference component with the down-link signal.

The pre-compensated down-link signal is represented by:

$$S_1(t) = [\text{Delta}T/T_{22}] \cdot Z_1(t),$$

where $Z_1(t)$ is the up-link or the signal resulting from a previous post-compensation process and $\text{Delta}T = (T_{11} \cdot T_{22} - T_{12} \cdot T_{21})$, T11 is the gain of the first satellite transmitter antenna in the direction of the receiver, T21 is the gain of the second satellite transmitter antenna in the direction of the receiver, T12 is a gain of the first satellite transmitter antenna in a direction of another receiver, and T22 is the gain of the second satellite transmitter antenna in the direction of the other receiver.

According to another aspect of the present invention, there is provided a method for minimizing co-channel interference on-board a satellite. The method includes both the post-compensation process and pro-compensation process described above.

According to another aspect of the present invention, there is provided a system for minimizing co-channel interference on-board a satellite. The system includes a post-compensation unit which compensates an up-link signal received by the satellite. The up-link signal includes a desired signal transmitted by a first transmitter and an interfering signal transmitted by a second transmitter. The post-compensation unit identifies the interfering signal based on post-compensation parameters including locations of the first transmitter and the second transmitter, carrier power levels of the desired signal and the interfering signal, and satellite antenna characteristics.

According to another aspect of the present invention, there is provided a system for minimizing co-channel interference on-board a satellite. The system includes a pro-compensation unit which pro-compensates a down-link signal to be transmitted from the satellite to a receiver. The down-link signal is transmitted from a first satellite transmitter antenna and an interfering signal, which interferes with the down-link signal, is transmitted from a second satellite antenna transmitter. The pre-compensation unit includes a determination unit which determines gain relations between a gain of the first satellite transmitter antenna in a direction of the receiver and a gain of the second satellite transmitter antenna in the direction of the receiver; a sampling unit which samples and scales interfering signals at the satellite based on the determined gain relations; and an estimating unit which estimates a co-channel down-link interference component that the down-link signal is expected to experience on a path to the receiver According to another aspect of the present invention, there is provided a system for minimizing co-channel interference on-board a satellite. The system includes both the post-compensation unit and pre-compensation unit described above.

According to another aspect of the present invention, there is provided a satellite system for minimizing co-channel interference. The satellite system includes a first source and a post-compensation unit. The first source receives a desired signal transmitted by a first transmitter and an interfering signal transmitted by a second transmitter. The desired signal and the interfering signal combine at the first source to produce an up-link signal. The post-compensation unit post-compensates the up-link signal received from the first source, wherein the post-compensation unit post-compensates the up-link signal by identifying the interfering signal based on post-compensation parameters including locations of the first transmitter and the second transmitter, carrier power levels of the desired signal and the interfering signal, and characteristics of the first source.

The first source may be a satellite receive antenna.

According to another aspect of the present invention, there is provided a satellite system for minimizing co-channel interference. The satellite system includes a first transmitter, a second transmitter, and a pre-compensation unit. The first transmitter transmits a down-link signal to a receiving earth station. The second transmitter transmits an interfering signal, which interferes with the down-link signal, to the receiving earth station. The pro-compensation unit pre-compensates the down-link signal to be transmitted from the first transmitter to the receiving earth station. The p-compensation unit includes a determination unit which determines gain relations between a gain of the first transmitter in a direction of the receiving earth station and a gain of the second transmitter in the direction of the receiving earth station, a sampling unit which samples and scales interfering signal at the satellite based on the determined gain relations, and an estimating unit which estimates a co-channel down-link interference component that the down-link signal is expected to experience on a path to the receiving earth station.

The first transmitter may be a first satellite transmit antenna and the second transmitter may be a second satellite transmit antenna.

According to another aspect of the present invention, there is provided a satellite system for minimizing co-channel interference. The satellite system includes components of both the above-noted satellite systems. For example, the satellite system includes a first source, a post-compensation unit, a first transmitter, a second transmitter, and a pr-compensation unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

The present invention will now be described more fully with reference to the accompanying drawings, in which exemplary embodiments of the invention are shown.

In the following description, matrix algebra is used to model and describe operations on signals. Lower case bolded variables, such as r represents signals vectors. Upper case bolded variables, such as R, represents matrices of complex (e.g., having both gain and phase) channel factors.

It is common for satellites to utilize different uplink and downlink frequencies, and intermediate frequencies within the satellite, which requires frequency shifting operations in the satellites, ground stations and/or both. Such frequency shifts are ignored for the purposes of describing the present invention.

Figure 1A:
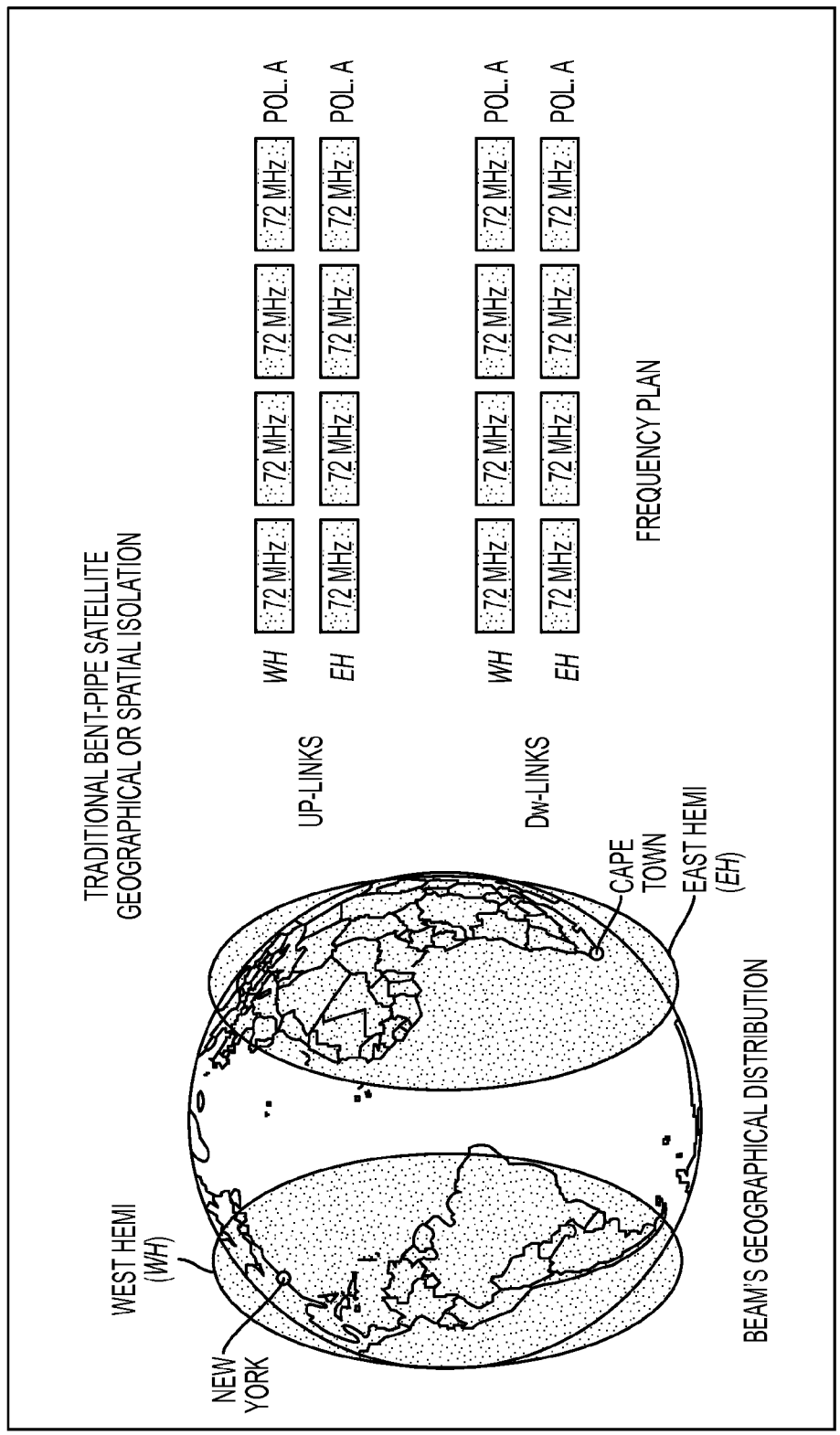
FIG. 1A illustrates a two beam frequency reuse technique in a satellite using the related art spatial isolation method.
Figure 1B:
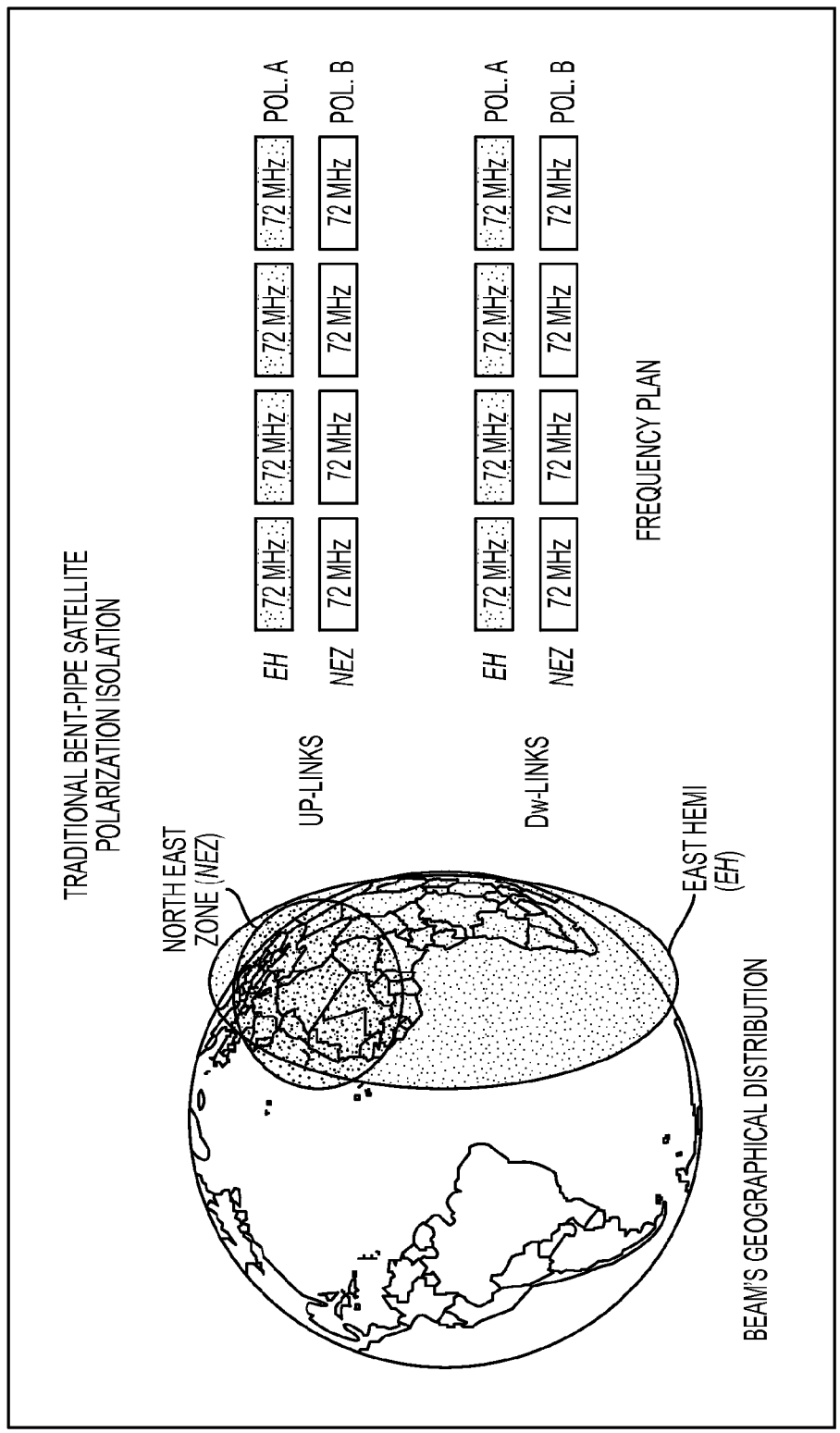
FIG. 1B illustrates a two beam frequency reuse in a satellite using the related art cross-polarization isolation method
Figure 2:
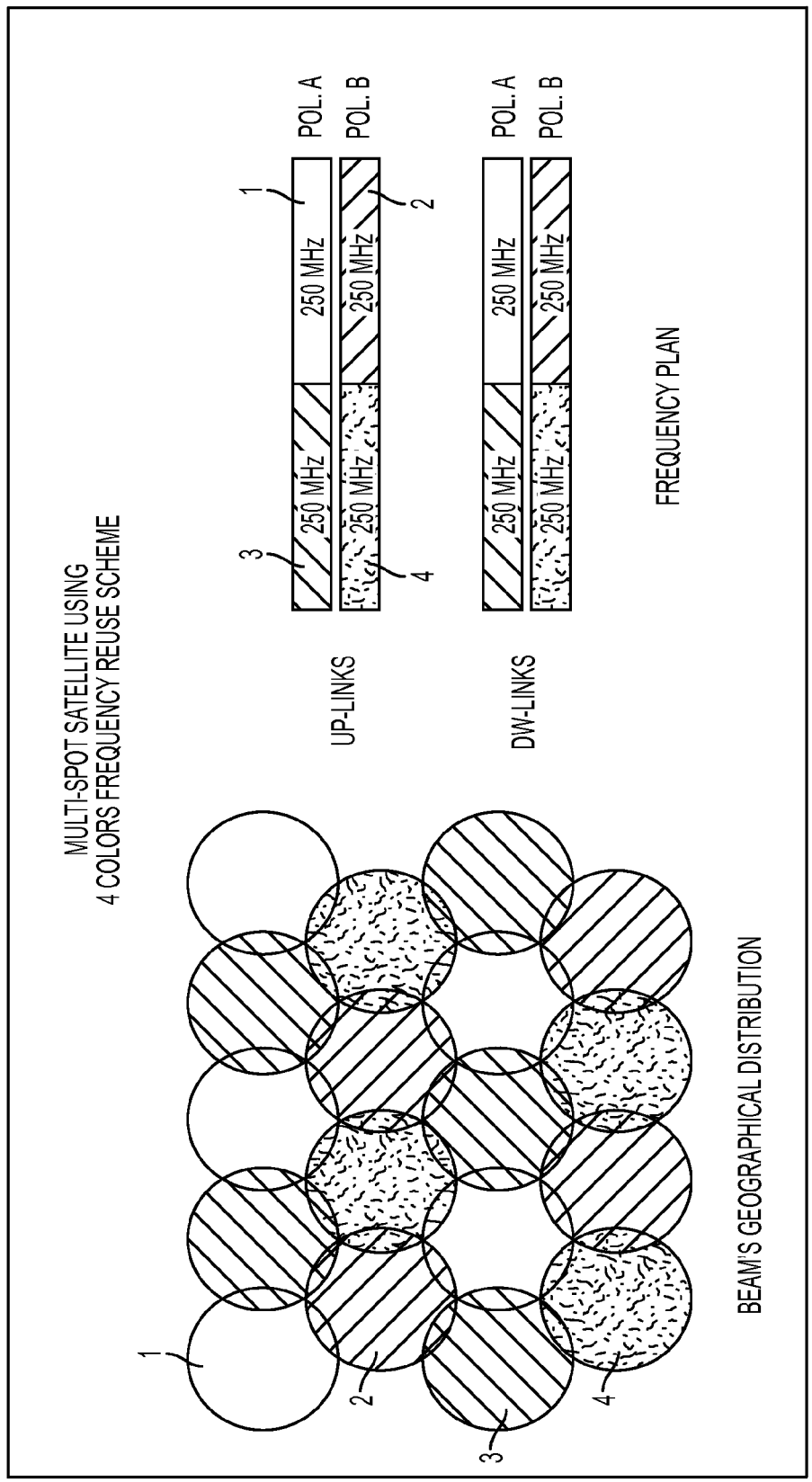
FIG. 2 illustrates the four-color beam frequency reuse scheme developed for a related art multi-spot beams satellite.
Figure 3:
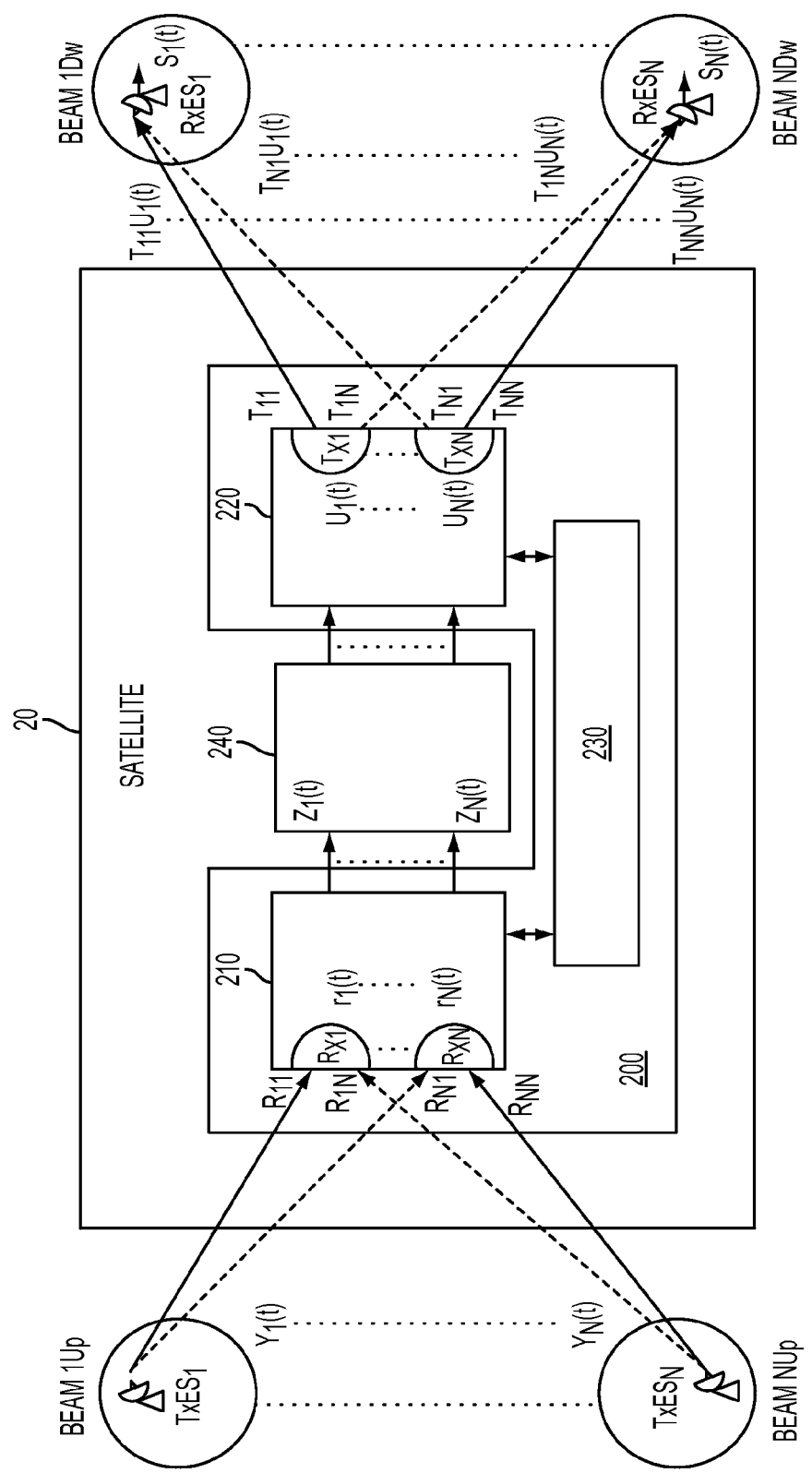
FIG. 3 illustrates a system for canceling co-channel interference, employed on-board a satellite, according to an exemplary embodiment of the present invention.

As illustrated in FIG. 3, one embodiment of the present invention provides a system 200 for canceling co-channel interference, employed on-board a satellite 20, which compensates the co-channel interference arising from imperfect satellite antenna beam-to-beam isolation and/or imperfect earth station cross-polarization isolation.

The satellite 20 is a telecommunications satellite in a geostationary orbit. However, the satellite 20 is not limited to this type of satellite. For example, the satellite 20 could be a Low Earth orbit (LEO) or a Medium Earth orbit (MEO) telecommunication satellite or a communications satellite used for deep space in spatial missions.

The system 200 includes a post-compensation section 210, a pre-compensation section 220, and a controller 230.

The satellite 20 with N beams, in general includes a switch 240 of N×N elements (N inputs by N outputs). In state of the art satellite systems, N varies from 2 to less than 100 depending on the size of the satellite and the number of beams it has. N may become larger than 100 with advances in signal processing and computational capacity and so the invention is only limited by available technology.

The N inputs $Y_1(t)$-$Y_N(t)$ are received from transmit earth stations $TxES_1$-$TxES_N$ at the satellite receive antennas Rx1-RxN, respectively. Each of the transmit earth stations $TxES_1$-$TxES_N$ transmits the respective signal $Y_1(t)$-$Y_N(t)$ in a corresponding up-link beam illustrated as Beam 1Up to Beam NUp.

The N outputs $U_1(t)$-$U_N(t)$ are transmitted from satellite transmit antennas Tx1-TxN to the receive earth stations $RxES_1$-$RxES_N$, respectively. Each of the satellite transmit antennas Tx1-TxN transmits the respective signal $U_1(t)$-$U_N(t)$ in a corresponding down-link beam illustrated as Beam 1Dw to Beam NDw.

The received signals $Y_1(t)$-$Y_N(t)$ at the satellite receive antennas Rx1-RxN are amplified by R, which represents the antenna gain of the satellite receive antennas Rx1-RxN. Thus, the resulting up-link signal $r_1(t)$ at the satellite receive antenna Rx1 is a combination of the desired signal $Y_1(t)$ amplified by antenna gain $R_{11}$ and the undesired signal $Y_N(t)$ amplified by antenna gain $R_{1N}$. Similarly, the resulting up-link signal $r_N(t)$ at the satellite receive antenna RxN is a combination of the desired signal $Y_N(t)$ amplified by antenna gain $R_{NN}$ and the undesired signal $Y_1(t)$ amplified by antenna gain $R_{N1}$. The signals $U_1(t)$-$U_N(t)$ are amplified by T, which represents the antenna gain of the satellite transmit antennas Tx1-TxN. The resulting down-link signal at the receive earth station $RxES_1$ is a combination of the signal $U_1(t)$ amplified by antenna gain $T_{11}$ and the signal $U_N(t)$ amplified by the antenna gain $T_{N1}$. Similarly, the resulting down-link signal at the receive earth station $RxES_N$ is a combination of the signal $U_N(t)$ amplified by antenna gain $T_{NN}$ and the signal $U_1(t)$ amplified by the antenna gain $T_{1N}$.

At each receive earth station RxES1-RxESN, the arriving signals interfere and combine to produce the output signals $S_1(t)$-$S_N(t)$. One of the objectives of the present invention is for the signals $S_1(t)$-$S_N(t)$ to be equal to the input signals $Y_1(t)$-$Y_N(t)$ at the satellite receive antennas Rx1-RxN.

The characteristics of the gains (R, T) of the satellite receive antennas and satellite transmit antennas are described in further detail below.

The post-compensation section 210 outputs signals $Z1(t)$-$ZN(t)$ to the switch 240—the signals $Z1(t)$-$ZN(t)$ have been compensated such that the corresponding undesired signals YN(t)-Y1(t) have been removed or their effect minimized.

The switch 240 creates the path to guide up-link signals from each uplink beam to the corresponding down-link beam. Depending on the satellite, the switch 240 could be reduced to fixed connections (no switch) or have complex switching circuits. Assuming a satellite loop back configuration—or no switch—, for all uplinks signals (inputs), their up-link beams are connected to the same beams in the down-link (outputs). In this case the matrix that represents the switch will be diagonal. The post-compensation section 210 will be located before the switch 240, and the pre-compensation section 220 will be located after the switch 240. Both the post-compensation section 210 and pre-compensation section 220 will have N inputs and N outputs, therefore their circuit response (e.g., a transform function) could be represented by diagonal N×N matrices.

FIG. 3 represents a system with N uplinks and N downlinks but for simplicity a 2×2 system will be referred to in the following description. The principles described for the 2×2 system will apply to the N×N system, as would be clear to those skilled in the art.

Figure 4:
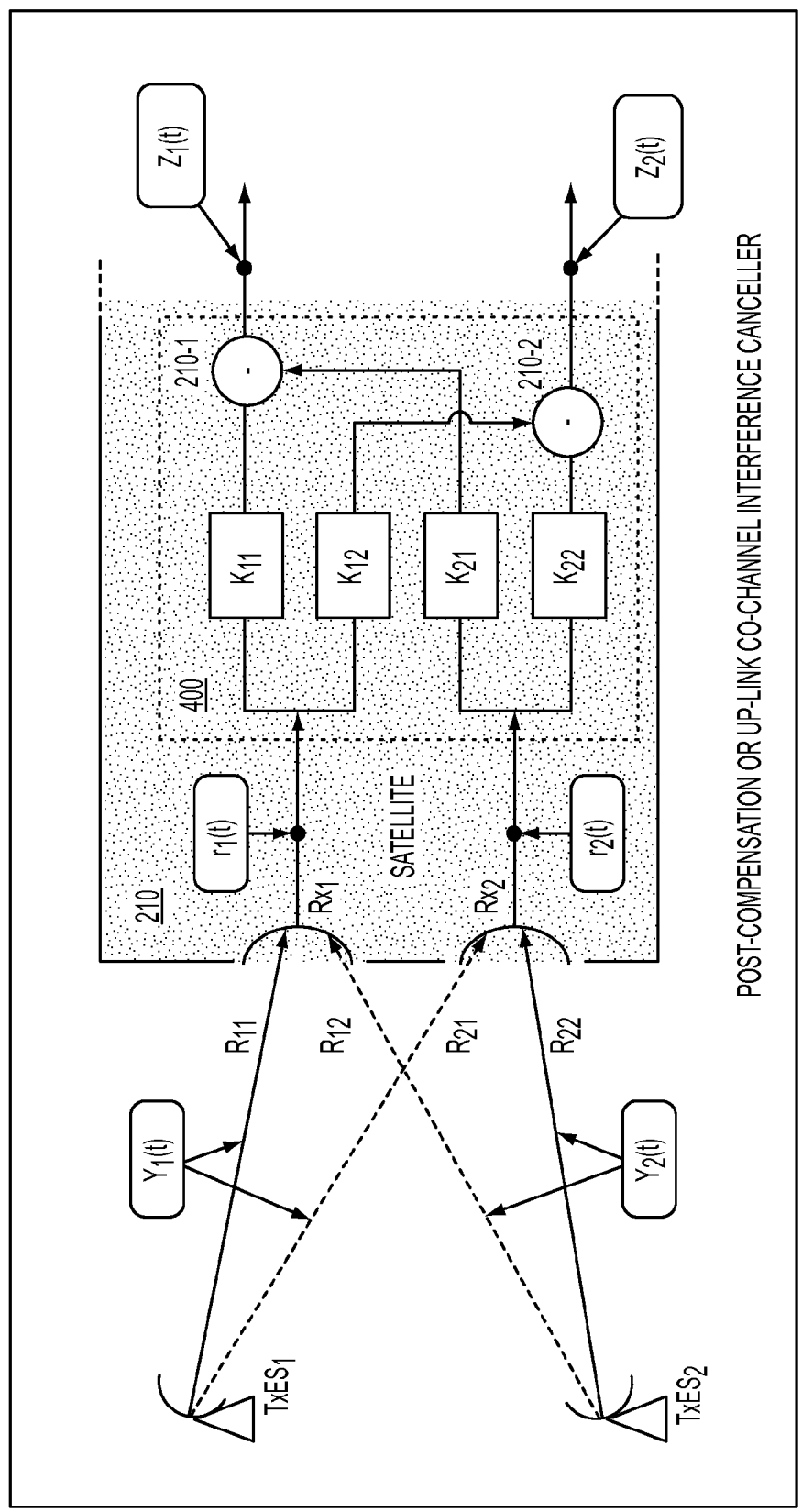
FIG. 4 illustrates a post-compensation section of the co-channel interference canceling system, according to an exemplary embodiment of the present invention.

FIGS. 4 and 5 show details of the post-compensator 210 and pre-compensator 220, respectively, for a 2×2 system.

In an alternative embodiment, the three tasks—post-compensation, pre-compensation and control—could be performed simultaneously, and also could be combined with the satellite switch function.

The post-compensation section 210, as illustrated in FIGS. 3 and 4, minimizes the co-channel interference experienced by the up-link signals and caused by the satellite receiver antenna gains (e.g., R12 or R21—see FIG. 4) in the direction of the undesired transmit earth station TxES2 or TxES1, respectively. Note that the satellite receive antennas Rx1-Rx2 receive the desired signals $Y_1(t)$-$Y_2(t)$, with gain R11 and R22, from TxES1 and TxES2, respectively. This process is labeled as post-compensation because the compensation process occurs after the reception of the interfering signals by the satellite 20. Since the compensation occurs on board of the satellite 20, there is no need to change or modify equipment at the transmitting earth stations TxES1 and TxES2.

Figure 5A:
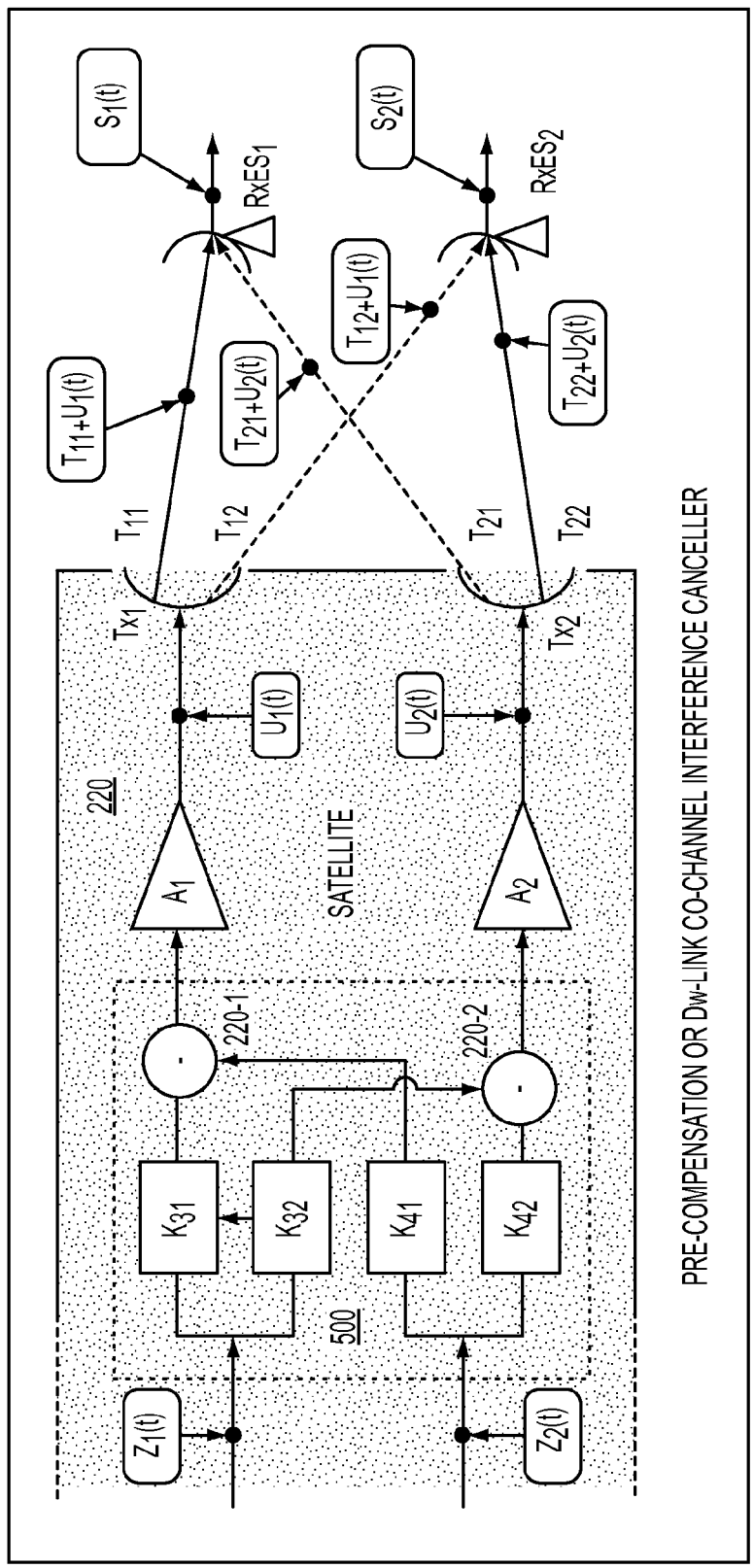
FIG. 5A illustrates a p b-compensation section of the co-channel interference canceling system, according to an exemplary embodiment of the present invention.

The pre-compensation section 220, as illustrated in FIGS. 3 and 5, minimizes the co-channel interference experienced by the down-links signals $U_1(t)$-$U_N(t)$ and caused by the gain (e.g., T12 or T21 in FIG. 5A) of the satellite transmit antennas Tx1-Tx2 in the direction of the undesired receive earth station RxES1 or RxES2, respectively. Note that the satellite transmit antennas Tx1 and Tx2 transmit the signals $U_1(t)$ and $U_2(t)$ with gain T11 and T22 toward the desired earth stations RxES1 and RxES2, respectively. In this case, the compensation of the downlink signals to be transmitted occurs on-board of the satellite 20 before the signals are transmitted and before that the interference occurs at the receive earth station $RxES_1$-$RxES_N$. Therefore, this process is labeled as pre-compensation. The cancellation or reduction of the co-channel interference occurs when the signals $U_1(t)$-$U_N(t)$ amplified by the corresponding antenna gain T arrive at the receive earth station $RxES_1$-$RxES_N$. The signals arriving at the same receive earth station combine and interfere on the subject receive earth station to create a new signal (S1(t)-SN(t)) free of (or with minimal) co-channel interference. As in the post-compensation process, since the pre-compensation process occurs on-board of the satellite 20, no additional equipment at the receive earth stations $RxES_1$-$RxES_N$ is needed.

The technique for post-compensation by the post-compensation section 210 and pr-compensation by the post-compensation section 220 is based on the signals received at, and transmitted by, the satellite in real time. Therefore it is possible using electronics (like attenuators, dividers, combiners, phase shifters, filters, etc.) or a combination of electronics and software (like analog-to-digital converters (ADC), digital-to-analog converters (DAC), shift registers, embedded software, etc.), as conventional and well-known in the art, to obtain samples of the interfering signals and process them to cancel (or at least minimize) the co-channel interference, as discussed in further detail below.

For satellites that are part of an open-network architecture, this process cannot be done in a teleport or earth station because each individual earth station does not know (i.e., is not aware of) the signals transmitted and/or received by the others earth stations—each teleport only knows its own transmit or receive signals. Some terrestrial techniques to mitigate the co-channel interference have been used in managed close-network architectures that use special designed satellites. These techniques are mainly based on frequency interleaving but result in a limitation on the total satellite capacity, as discussed earlier.

An onboard satellite computer such as the controller 230 can analyze the characteristics between signal carriers and determine the required compensations in order to minimize the impact of the co-channel interference. The controller 230 identifies whether a signal carrier needs post-compensation, pre-compensation or both. To perform these functions the controller 230 would require that some information be available beforehand; and this information can be stored in a database. A list of the required information is included below but is not limited to these parameters:

1) The gain grid characteristic of the satellite's receiver and transmit antennas. This is the satellite antenna gain in different directions.
2) Some satellite internal characteristics (cable delays, gains, attenuations, etc.)
3) The satellite transponder operational characteristics (e.g., Saturation Flux Density (SFD), transmitter output Back Off (OBO), etc.)
4) The locations of the terrestrial transmit antennas (latitude, longitude, altitude)
5) The locations of the terrestrial receiver antennas (latitude, longitude, altitude)
6) The up-link and down-link carrier operational powers levels
7) The co-polarized and cross polarized earth antenna gains (for both up and down-link)

Once the satellite is designed and built, parameters 1) and 2) become fixed parameters, whereas parameters 3), 4), 5), 6) and 7) could vary according to the requirements of the terrestrial networks, but they are known by the satellite operator. These parameters may be available in a database; and the parameters will be dynamically updated as required by changes in the terrestrial networks, carriers' operational parameters, or in the satellite configuration. Embodiments of this system and method could include a satellite resident database or a terrestrial resident database that communicates the required parameters to the satellite processor. This method also may use correlations to estimate the location of the transmit antennas and eliminate the need of parameter 5).

In a first approach, the satellite link circuit response may be described using the following equation:

$$S = M*Y \qquad \text{(equation 1)}$$

where Y is the input vector with N elements and S is the output vector with N elements, and M is an N×N matrix representing the circuit response which incorporates the co-channel interference elements.

Ideally, the target in a satellite link circuit response is that the output S be equal to the input Y, however, due to the co-channel interference and other noises, the is some degradation that can be modeled inside the matrix M. The matrix M can be split in two separate matrices representing the uplink and downlink circuit responses, respectively. To cancel the effects of the c-channel interference, another matrix A can be incorporated into equation 1, as shown in equation 2:

$$S = A*M*Y \qquad \text{(equation 2)}$$

where $A = M^{-1}$ (inverse matrix of M)

Yet another way to cancel the co-channel interference is for the controller 230 on the satellite 20 to recreate the inverse matrix of the satellite link circuit response and apply it to the signals that traverse the satellite. This method will be referred to below as the "multiplicative method".

FIG. 4 illustrates the post-compensation section 210 in further detail. As mentioned previously, the post-compensation section can have N inputs and N outputs but for the sake of simplicity, a 2×2 system is described. The principles described for the 2×2 system will apply to the N×N system, as would be clear to those skilled in the art.

In this exemplary embodiment, the post-compensation section 210 has two inputs at satellite receive antennas Rx1 and Rx2. The post-compensation section 210 also includes a post-compensation network 400 including attenuators $K_{11}$, $K_{12}$, $K_{21}$, $K_{22}$ and subtraction units 210-1 and 210-2. The contents and use of the post-compensation network 400 are described in further detail below.

The post-compensation section 210 performs the compensation and/or cancellation after reception of the interfering signals at the satellite 20. The figure represents the flow of signals considering two up-link carriers Y1(t) and Y2(t) transmitted by two different earth station antennas (TxES1 and TxES2) located under different satellite co-channel beams. Both carriers operate at the same frequency with same or opposite polarization. It is assumed that both carriers arrive at the satellite with the same up-link equivalent isotropic radiated power (EIRP) density.

The corresponding satellite receive antenna gains R of the desired signal Y1(t) and Y2(t) received at the satellite receiver antennas Rx1 and Rx2 are R11 and R22, respectively, where N=2. The co-channel interference is a consequence of the residual satellite antenna gains R12 and R21 toward the transmit antenna that operates in the other beam. Specifically, the co-channel interference is represented by the undesired signal Y1(t), amplified by the residual satellite antenna gain R21, arriving at the satellite receiver antenna Rx2, and the undesired signal Y2(t), amplified by the residual satellite antenna gain R12, arriving at the satellite receiver antenna Rx1.

The satellite antenna gain Rij is a complex number (where 'i' represents the satellite receive antenna number and the 'j' represents the transmit earth station number in the N×N system), having both gain and phase. In an effort to simply the mathematical equations, the gain R in the disclosed model includes the following factors representing at least each of the following elements:

(a) Earth station uplink (transmit) antenna gain (both co-pol and cross-pol in the case of satellites employing frequency reuse by means of cross-pol isolation), (b) Uplink path loss, (c) Satellite uplink (receive) antenna gain—both co-polarization (co-pol) and cross-polarization (cross-pol) in the case of satellites employing frequency reuse by means of cross-pol isolation, and (d) Satellite channel gain, defined as the gain from the output of the satellite uplink antenna to the input of the satellite downlink (transmit) antenna.

In an N×N system the signal at the input of the post-compensation section 210 could be expressed as r=Ry where y represents the signals transmitted from the earth station uplink antenna toward the satellite. R is an N×N square matrix which represents the uplink channel gains and N is the number of uplink channels.

For a case with 2 signals Y1(t) and Y(2)t (one for each channel with inputs at Rx1 and Rx2, respectively) as shown in FIG. 4, we have:

$$y = \begin{bmatrix} y_1 \\ y_2 \end{bmatrix}$$

where $y_i$ represents the signal (at the input to the transmit earth station $TxES_i$) destined to the satellite receive antenna (Rxi) beam for channel i. In general the signals are represented as, $y_i = A_i(t)e^{j\omega_i t + \phi_i(t)}$ where $A_i(t)$ is the amplitude of the signal as a function of time $\omega_i$ is the angular frequency of the signal in radians per second $\phi_i(t)$ is the phase variation of the signal as a function of time.

For a 2×2 system, matrix R would be represented as $$\begin{Bmatrix} R_{11} & R_{12} \\ R_{21} & R_{22} \end{Bmatrix}.$$

The notation $R_{ij}$ indicates the complex gain of the signal intended for the $i^{th}$ channel as received by the $j^{th}$ channel. As described earlier, $R_{11}$ and $R_{22}$ are gains for the desired signals in channels 1 and 2, whereas $R_{12}$ and $R_{21}$ are gains for the interfering signals into channels 1 and 2 respectively.

There are two alternative approaches to cancelling the interfering signals: subtractive and multiplicative. Each is described below.

Subtractive Model for Post-Compensation (Uplink Cancellation)

The first approach is to subtract a scaled version of the input at the post-compensation section 210 for an interfering channel (e.g., $R_{12}$ or $R_{21}$, where N=2) from the input of the desired channel (e.g., $R_{11}$ or $R_{22}$, where N=2), as shown in FIG. 4. The output of the post-compensation section 210 is:

$$z = Ry - XRy \quad \text{(equation 3)}$$

where X is the canceller complex scaling factor. The objective is for z to have no interfering terms, and thus it is desired that:

$$z = Ry - XRy = \text{diag}(R)y \quad \text{(equation 4)}$$

Solving for X results in:

$$X = 1 - \text{diag}(R)R^{-1} \quad \text{(equation 5)}$$

For a 2 channel case, this results in:

$$X = \begin{bmatrix} 1 & 0 \\ 0 & 1 \end{bmatrix} - \text{diag}\left(\begin{bmatrix} R_{11} & R_{12} \\ R_{21} & R_{22} \end{bmatrix}\right)\begin{bmatrix} R_{11} & R_{12} \\ R_{21} & R_{22} \end{bmatrix}^{-1} \quad \text{(equation 6)}$$

In the 2×2 example show in FIG. 4 the signals at the input of the post canceller can be written as:

$$r_1(t) = R_{11} \cdot Y1(t) + R_{12} \cdot Y_2(t)$$

$$r_2(t) = R_{21} \cdot Y_1(t) + R_2 \cdot Y_2(t)$$

Then, the post-compensation network 400 integrated by the attenuators $K_{11}$, $K_{12}$, $K_{21}$, $K_{22}$ and two subtraction units 210-1 and 210-2 is considered.

The first numeral in the subscript for the attenuators K identifies the satellite receive antenna at which the signal being passed through the subject attenuator is received. For example, the signal $r_1(t)$ received at satellite receive antenna Rx1 is passed through $K_{11}$ and $K_{12}$, and the signal $r_2(t)$ received at satellite receive antenna Rx2 is passed through $K_{21}$ and $K_{22}$.

The second numeral in the subscript of the attenuators K dictate the destination of the attenuator output—this second numeral is related to the intended satellite receive antenna for the signal being passed through the subject attenuator. For example, the output of the attenuators $K_{11}$ and $K_{21}$ is sent to subtraction unit 210-1 whereas the output of the attenuators $K_{12}$ and $K_{22}$ is sent to the subtraction unit 210-2.

In view of this post-compensation network 400, it is possible to demonstrate that if the network element are selected with the following values: $K_{11} = K_{22} = 1$; $K_{12} = R_{12}/R_{22}$ and $K_{21} = R_{21}/R_{11}$, the effect of the up-link co-channel interference could be ideally cancelled and the output signals $Z_1(t)$ and $Z_2(t)$ can be expressed as:

$$Z_1(t) = [\text{Delta}R/R_{22}] \cdot Y_1(t)$$

$$Z_2(t) = [\text{Delta}R/R_{11}] \cdot Y_2(t)$$

where DeltaR = $(R_{11} \cdot R_2 - R_{12} \cdot R_{21})$

Multiplicative Model for Post-Compensation (Uplink Cancellation)

In the multiplicative model, the received signal can be expressed in vector form as: r=Ry (equation 7)

where $$R = \begin{bmatrix} R_{11} & R_{12} \\ R_{21} & R_{22} \end{bmatrix}$$

is the channel matrix (again, shown for a 2 channel example). The post-compensation section 210 operates on the received signal as follows:

$$z=Wr=WRy \quad \text{(equation 8)}.$$

The post-compensation section 210 chooses W such that $$W=GR^{-1} \quad \text{(equation 9)}$$

where $R^{-1}$ is the inverse of the channel matrix, i.e., $$R^{-1} = \frac{1}{R_{11}R_{22} - R_{12}R_{21}} \begin{bmatrix} R_{22} & -R_{12} \\ -R_{21} & R_{11} \end{bmatrix}, \quad \text{(equation 10)}$$

and G is a diagonal gain (scaling) matrix given by $$G = \begin{bmatrix} R_{11} & 0 \\ 0 & R_{22} \end{bmatrix}.. \quad \text{(equation 11)}$$

If all the parameters of the channel matrix are known exactly then the cancellation is perfect or ideal, and $z=WRy=GR^{-1}$ or $z=Gy$ so each component is: $z_1=R_{11}y$ and $z_2=R_{22}y_2$.

Figure 6B:
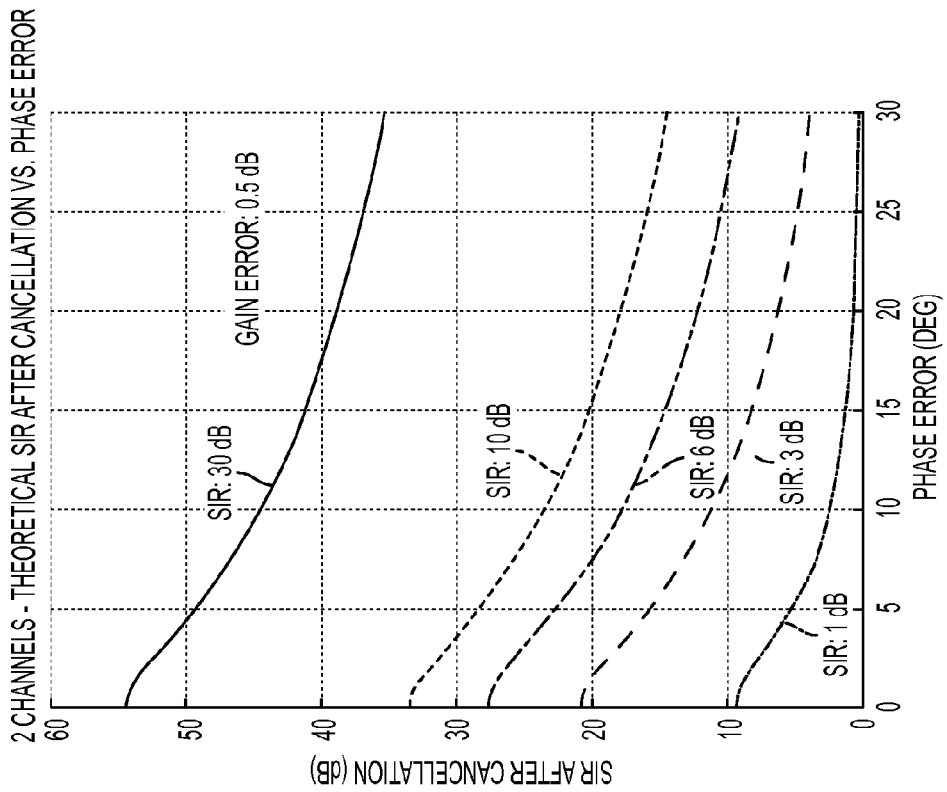
FIGS. 6A and 6B illustrate the variation of the Signal-to-Interference ratio (SIR) improvement (above the original SIR) for a case with two signals (one interfering signal), in one exemplary embodiment using only the post-compensation (Uplink).
Figure 6A:
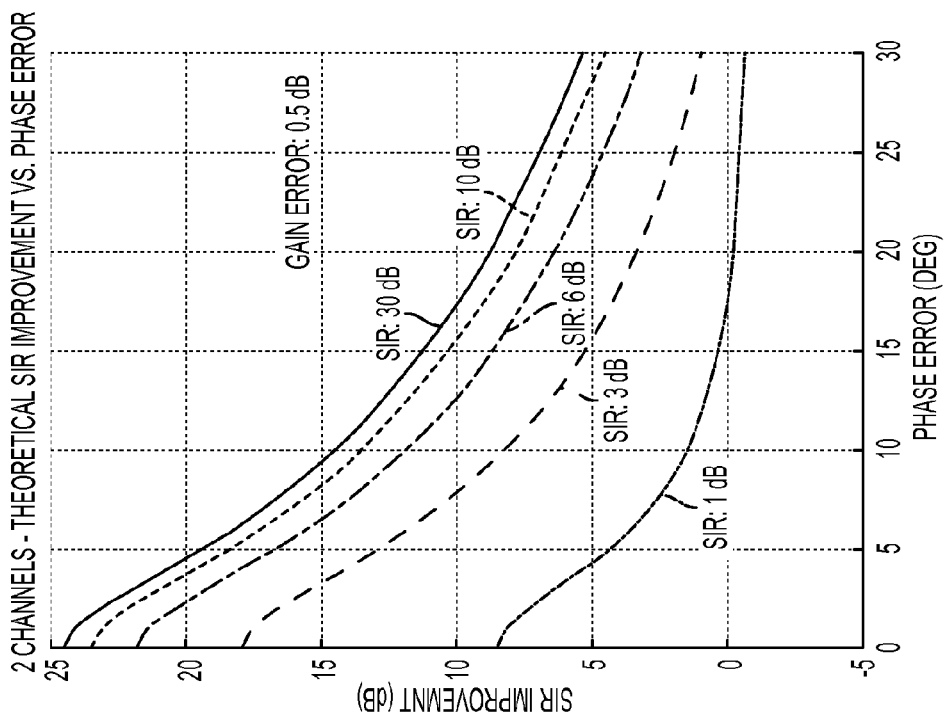

FIG. 6A illustrates the SIR improvement (above the original SIR) after cancellation as a function of the phase error for a case with two signals (one interferer) using only the post-compensation.

FIG. 6B illustrates after cancellation as a function of the phase error for a case with two signals (one interferer) using only the post-compensation.

FIGS. 6A-6B show that high cancellation gain can be achieved if the phase error is relatively low. Further explanation about this characteristic is discussed later with respect to FIGS. 9A-9B.

FIG. 5A illustrates the pre-compensation section 220 in further detail. As mentioned previously, the pr-compensation section 220 can have N inputs and N outputs but for the sake of simplicity, a 2×2 system is described. Further, it is assumed that the outputs $Z_1(t)$ and $Z_2(t)$ of the post-compensation section 210 are received by the pre-compensation section 220 as inputs.

The pre-compensation section 220 includes a pr-compensation network 500 including attenuators $K_{31}$, $K_{32}$, $K_{41}$, $K_{42}$ and subtraction units 220-1 and 220-2. The pre-compensation section 220 also includes amplifiers $A_1$ and $A_2$. The contents and use of the post-compensation network 500 are described in further detail below.

In this exemplary embodiment, the pre-compensation section 220 (in other words, a downlink canceller) operates on the signals received at the satellite 20 and, using knowledge of the satellite downlink path, anticipates the interference and "pre-distorts" the signals to cancel the interference (that signals will experience when they arrive at the receiver earth stations) before the signals are transmitted by the satellite. Both the subtractive and multiplicative models discussed above with respect to post-compensation section 210 are also applicable to the pre-compensation section 220, as discussed below.

Subtractive Model for Pre-Compensation (Downlink Cancellation)

As for the uplink case discussed above, the signals at earth station receiver could be expressed as: s=Tz where z represents the input signals to the satellite receive up-link or the signal resulting from a previous post-compensation process and T represents the dwlink channel matrix.

For a 2×2 system, the representative matrix would be:

$$\begin{vmatrix} T11 & T12 \\ T21 & T22 \end{vmatrix}_\perp.$$

A scaled version of the input for an interfering channel needs to be subtracted from the input of the desired channel, as shown in FIG. 5A. The output of the canceller is:

$$s=Tz-XTz=(1-X)Tz \quad \text{(equation 12)}$$

where X is the canceller complex scaling factor. The objective is for the composite signal s, at the output of the receive earth station, to have no downlink interfering components. A downlink channel matrix T is defined which represents the gain of the downlink from the input to the satellite downlink (transmit) antenna (Tx1 or Tx2) to the output of the earth station downlink (receive) antenna (RxES1 or RxES2). T is comprised of factors representing at least each of the following elements:

Therefore, the signals $U_1(t)$-$U_N(t)$ transmitted by the satellite transmit antennas Tx1-TxN are amplified by T, which represents the antenna gain of the satellite transmit antennas Tx1-TxN. As shown in FIG. 5A, the resulting down-link signal at the receive earth station $RxES_1$ is a combination of the signal $U_1(t)$ amplified by antenna gain $T_{11}$ and the signal $U_N(t)$ amplified by the antenna gain $T_{21}$. Similarly, the resulting down-link signal at the receive earth station $RxES_2$ is a combination of the signal $U_2(t)$ amplified by antenna gain $T_{22}$ and the signal $U_1(t)$ amplified by the antenna gain $T_{12}$.

Figure 5B:
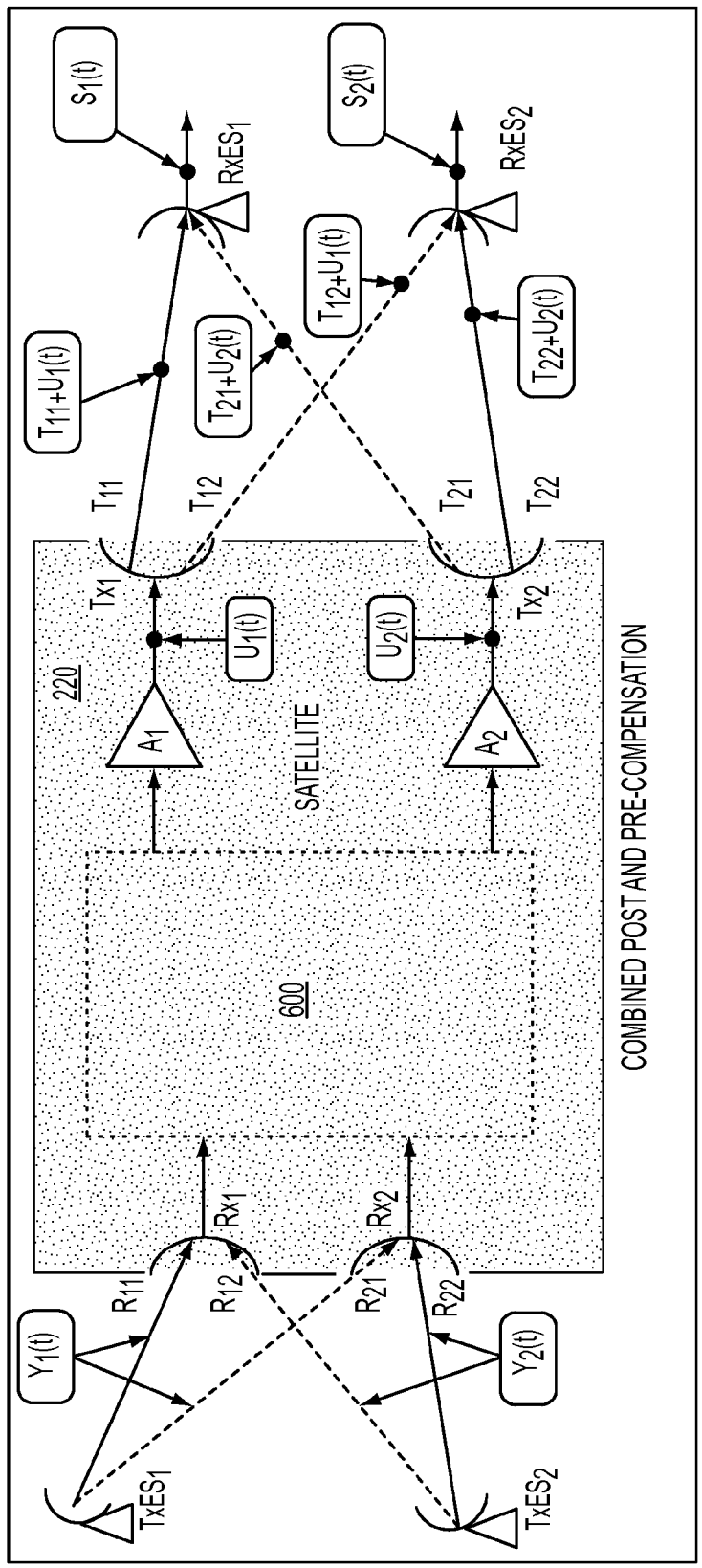
FIG. 5B illustrates an alternative embodiment in which both the post-compensation section and the pro-compensation section can operate simultaneously in a combined cancellation mode.

In an effort to simplify the mathematical equations, in the disclosed model, the gain T of the satellite transmit antennas is comprised of factors representing at least each of the following elements:

(a) The channel gain from the output of the canceller to the input of the satellite downlink antenna which includes the satellite high power amplifier illustrated as $A_1/A_2$ in FIG. 5A-B, (b) Satellite downlink (transmit) antenna gain (both co-pol and cross-pol in the case of satellites employing frequency reuse by means of cross-pol isolation), (c) Downlink path loss, and (d) Earth station downlink (receive) antenna gain (both co-pol and cross-pol in the case of satellites employing frequency reuse by means of cross-pol isolation).

Therefore s=Tz. (equation 13)

The objective is for s to have no interfering terms, this means that the desired representation of s is as follows:

$$s=T(1-x)z=\text{diag}(T)z. \quad \text{(equation 14)}$$

Solving for x, $(1-X)=T^{-1}\text{diag}(T)$ $$X=1-T^{-1}\text{diag}(T) \quad \text{(equation 15)}$$

In the 2×2 example show in FIG. 5A, the signals after the earth station receivers can be written as:

$$S1(t)=(G3/L3)\cdot(T11\cdot U1+T21\cdot U2) \quad \text{(equation 16-1)}$$

$$S2(t)=(G4/L4)\cdot(T12\cdot U1+T22\cdot U2), \quad \text{(equation 16-2)}$$

were U1(t) and U2(t) were equal to Z1(t) and Z2(t) if the pre-compensation was not performed.

where G3 and G4 are the receive antenna gains and L3 and L4 are the space loss factors from the satellite transmit antennas Tx1/Tx2 to the respective earth station receiver antennas $RxES_1/RxES_2$.

Then, the pre compensation network 500 integrated by the attenuators $K_{31}$, $K_{32}$, $K_{41}$, $K_{42}$ and the two subtraction units 210-1 and 210-2 is considered.

The first numeral in the subscript for the attenuators K (in the pre-compensation network 500) identifies the input channel through which the signal being passed through the subject attenuator is received. For example, the signal $z_1(t)$ received from the post-compensation section 210 is passed through $K_{31}$ and $K_{32}$, and the signal $z_2(t)$ received from the post-compensation section 210 is passed through $K_{41}$ and $K_{42}$.

The second numeral in the subscript of the attenuators K (in the pre-compensation network 500) dictate the destination of the attenuator output—this second numeral is related to the intended earth station receive antenna for the signal being passed through the subject attenuator. For example, the output of the attenuators $K_{31}$ and $K_{41}$ is sent to subtraction unit 220-1 whereas the output of the attenuators $K_{32}$ and $K_{42}$ is sent to the subtraction unit 220-2.

In view of this pre-compensation network 500, it is possible to demonstrate that if the network element are selected with the following values: $K_{31}=K_{42}=1$; $K_{32}=T_{12}/T_{22}$ and $K_{41}=T_{21}/T_{11}$, the effect of the down-link co-channel interference could be ideally cancelled and the received signals $S_1(t)$ and $S_2(t)$ can be expressed as:

$$S_1(t)=[\text{Delta}T/T_{22}]\cdot Z1(t)$$

$$S_2(t)=[\text{Delta}T/T_{11}]\cdot Z2(t)$$

where $\text{DeltaT}=(T11\cdot T22-T12\cdot T21)$

Multiplicative Model for the Pre-Compensation (Downlink Cancellation)

The received signal (at the downlink earth station) can be expressed in vector form as s=Tz (equation 17)
where R is the received (uplink) channel matrix (shown for a 2×2 example), T is the transmit (downlink) channel matrix, and y is the signal at the input to the satellite uplink antenna.

The pro-compensation section 220 operates on the signal as follows:

$$s=Wz. \quad \text{(equation 18)}$$

The pro-compensation section 220 chooses W such that $$w=GT^{-1} \quad \text{(equation 19)}$$

where $T^{-1}$ is the inverse of the channel matrix, i.e., $$T^{-1} = \left[\frac{1}{T_{11}T_{22}-T_{12}T_{21}}\right]\begin{bmatrix} T_{22} & -T_{12} \\ -T_{21} & T_{11} \end{bmatrix} \quad \text{(equation 20)}$$

and G is a diagonal gain (scaling) matrix given by $$G = \begin{bmatrix} T_{11} & 0 \\ 0 & T_{22} \end{bmatrix}. \quad \text{(equation 21)}$$

If all the parameters of the channel matrix are known exactly then the downlink cancellation is perfect or ideal, and $$s=WTz=GT^{-1}z \text{ or } s=Gz \quad \text{(equation 22)}$$

Figure 7:
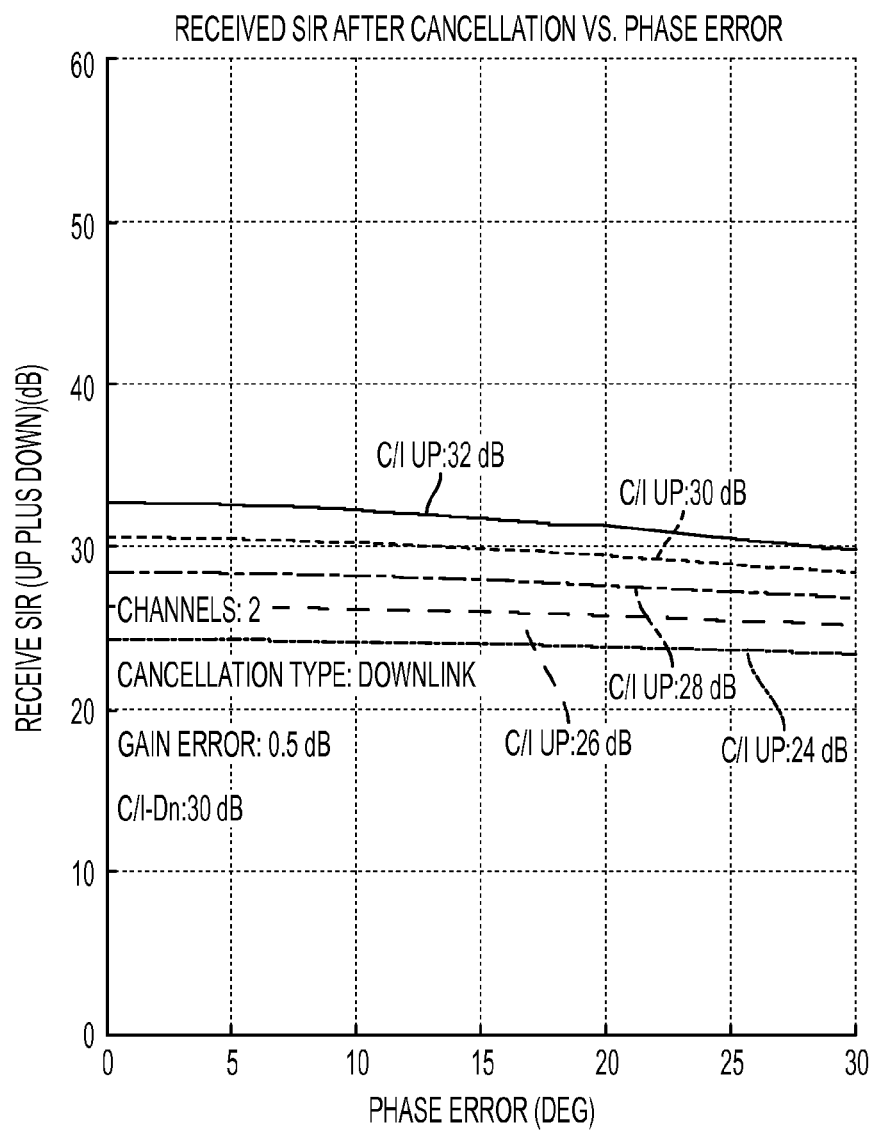
FIG. 7 illustrates the total Signal-to-Interference Ratio (SIR) after cancellation as function of the phase error, for a case with two signals (one interfering signal), in one exemplary embodiment using only the pre-compensation (downlink).

FIG. 7 illustrates the Signal-to-Interference Ratio (SIR) improvement (above the original SIR) as function of the phase error, for a case with two signals (one interfering signal), in one exemplary embodiment using only the pre-compensation (down-link). FIG. 7 shows that high cancellation gain could be achieved in the ideal case that the phase error is relatively low. Further explanation about this characteristic is discussed later with respect to FIGS. 9A-B.

Combined Uplink and Downlink Cancellation

FIG. 5B illustrates an alternative embodiment in which both the post-compensation section and the pro-compensation section can operate simultaneously in a combined cancellation mode. The components and signals that are identical to FIG. 5A have already been described with respect to FIG. 5A.

In FIG. 5B, a device 400 allows for the post-compensation process and pr-compensation process to be operated simultaneously in a device 600.

Subtractive Model for Combined Cancellation

The signal received at the downlink earth station can be expressed in vector form by the device 600 as s=TRy where R is the received (uplink) channel matrix, T is the transmit (downlink) channel matrix, and y is the signal at the input to the satellite uplink antenna.

As for the post-compensation/uplink case, the signal at the canceller input is: r=Ry where y represents the input signals to the earth station uplink antenna and R represents the uplink channel matrix. As before, for a 2×2 matrix, R would be:

$$\begin{Bmatrix} R_{11} & R_{12} \\ R_{21} & R_{22} \end{Bmatrix}.$$

A scaled version of the system input for an interfering channel would be subtracted from the system input of the desired channel. The output of the canceller is: z=Ry−XRy= (1−X)Ry (equation 23)

where X is the canceller complex scaling factor. It is desired that the composite signal s, at the output of the earth station receive antenna have no interfering components. As before, s=Tz with T represents the downlink channel matrix. This means that the following representation of s is desired:

$$s=T(Ry-XRy)=\text{diag}(T)\text{diag}(R)y \quad \text{(equation 24)}$$

Solving for X results in:

$$X=1-T^{-1}\text{diag}(R)\text{diag}(T)R^{-1} \quad \text{(equation 25)}$$

Applying the cancellation results in the following signal at the receive earth station's antenna output:

$$s=Tz=T(Ry-XRy)=T(1-X)Ry,$$

which can also be expressed as:

$$s=T(T^{-1}\text{diag}(R)\text{diag}(T)R^{-1})Ry=\text{diag}(R)\text{diag}(T)y \quad \text{(equation 26)}.$$

Multiplicative Model for Combined Cancellation

The signal received at the downlink earth station can be expressed in vector form as s=TRy where R is the received (uplink) channel matrix (shown for a 2×2 example), T is the transmitted (downlink) channel matrix, and y is the signal at the input to the satellite uplink antenna.

The canceller operates on the signal as follows:

$$s=Wr=WRy \quad \text{(equation 27)}$$

The canceller chooses W such that $$W=GT^{-1}R^{-1} \quad \text{(equation 28)}$$

where $T^{-1}$ is the inverse of the transmit (downlink) channel matrix, $R^{-1}$ is the inverse of the receive (uplink) channel matrix, and G is a diagonal gain (scaling) matrix given by $$G = \begin{bmatrix} T_{11}R_{11} & 0 \\ 0 & T_{22}R_{22} \end{bmatrix}.$$

In the above examples, it is assumed that the co-channel interfering signals are the same for both uplink signals and downlink signals but they could be different.

Figure 8:
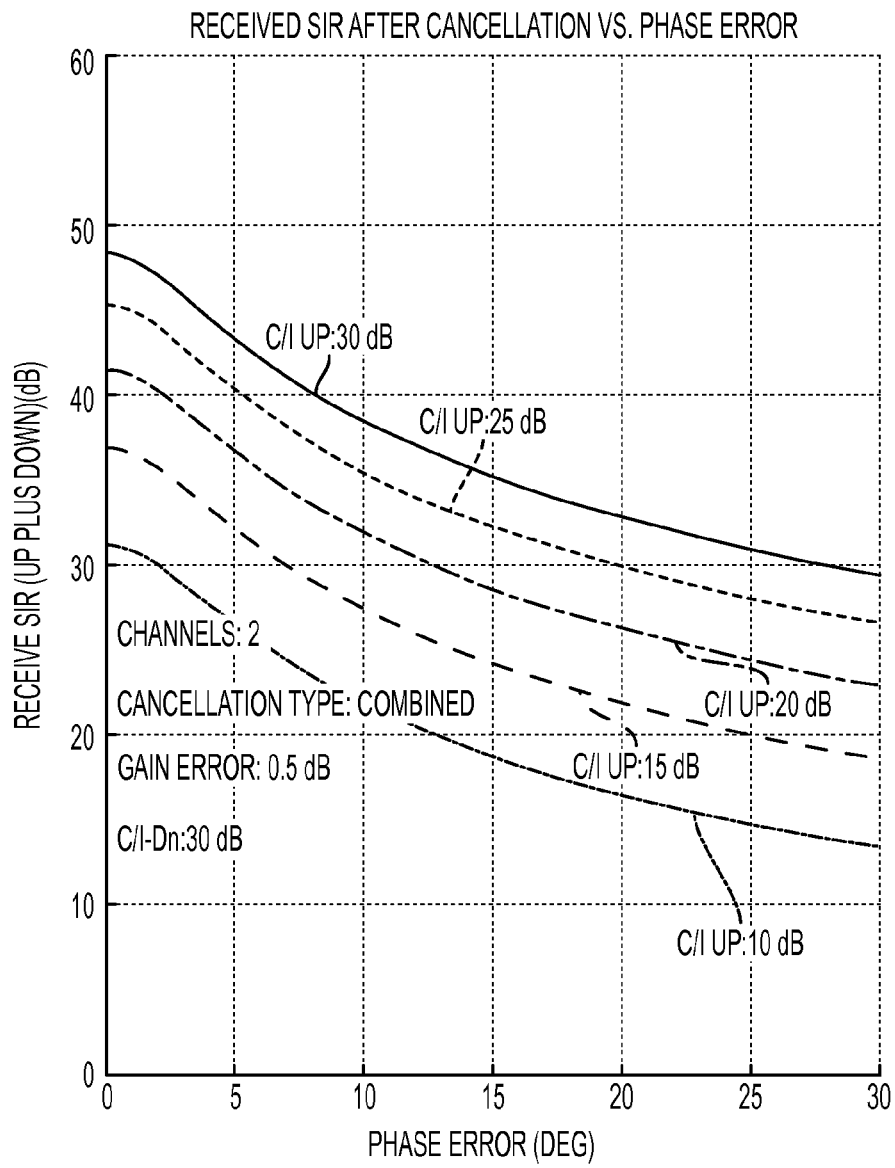
FIG. 8 illustrates the total Signal-to-Interference Ratio (SIR) after cancellation as function of the phase error, for a case with two signals (one interfering signal), in one exemplary embodiment of combined post and pre-compensation (Uplink and Downlink).

FIG. 8 illustrates the total Signal-to-Interference Ratio (SIR) after cancellation as function of the phase error, for a case with two signals (one interfering signal), in one exemplary embodiment of combined post and pre-compensation (up-link and down-link). It also shows that high cancellation gain could be achieved in the ideal case that the phase error is relatively low. Further explanation about this characteristic will be described later with respect to FIGS. 9A-B.

Effect of Signal-to-Interference Ratio (SIR) on Cancellation Performance

This section provides a theoretical analysis of the cancellation performance, i.e., SIR Improvement, as a function of the initial (un-cancelled) SIR for the post-compensation/uplink cancellation case.

The received signal at the input to the canceller can be expressed in vector form as: $r=Ry$ where $$R = \begin{Bmatrix} R_{11} & R_{12} \\ R_{21} & R_{22} \end{Bmatrix}$$

is the channel matrix (shown for a 2×2 example). As noted above, however, the system can be implemented in an N×N configuration (i.e., N uplinks and N downlinks) but the 2×2 system example is described for the sake of simplicity.

The SIR for channels 1 and 2 before cancellation can be calculated as:

$$SIR_{IN-1} = \frac{|R_{11}|^2}{|R_{12}|^2} = \frac{R_{11}R_{11}^*}{R_{12}R_{12}^*} \quad \text{(equation 29)}$$

$$SIR_{IN-2} = \frac{|R_{22}|^2}{|R_{21}|^2} = \frac{R_{22}R_{22}^*}{R_{21}R_{21}^*} \quad \text{(equation 30)}$$

The system operates on the received signal as follows: $z=Wr=WRy$

The canceller chooses W such that $W=GR^{-1}$ where $R^{-1}$ is the inverse of the channel matrix, i.e., $$R^{-1} = \frac{1}{R_{11}R_{22} - R_{12}R_{21}} \begin{bmatrix} R_{22} & -R_{12} \\ -R_{21} & R_{11} \end{bmatrix} \quad \text{(equation 31)}$$

and G is a diagonal gain (scaling) matrix given by $$G = \begin{bmatrix} R_{11} & 0 \\ 0 & R_{22} \end{bmatrix}.$$

If all the parameters of the channel matrix are known exactly then the cancellation is perfect and $z=WRy=GR^{-1}Ry$, or $z=Gy$ so each component is:

$$z_1 = R_{11}y_1 \quad \text{(equation 32)}$$

$$z_2 = R_{22}y_2 \quad \text{(equation 33)}$$

Note that:

$$W = GR^{-1} = \frac{1}{R_{11}R_{22} - R_{12}R_{21}} \begin{bmatrix} R_{11}R_{22} & -R_{12}R_{11} \\ -R_{21}R_{22} & R_{11}R_{22} \end{bmatrix},$$

out $R_{11}R_{22}$ gives $$W = GR^{-1} = \frac{R_{11}R_{22}}{R_{11}R_{22} - R_{12}R_{21}} \begin{bmatrix} -1 & -R_{12}/R_{22} \\ -R_{21}/R_{11} & 1 \end{bmatrix} \quad \text{(equation 34)}$$

Also note that $R_{12}R_{21}$ is a squared leakage term. $R_{12}R_{21} \ll R_{11}R_{22}$, so to a very good approximation is:

$$W \cong \begin{bmatrix} 1 & -R_{12}/R_{22} \\ -R_{21}/R_{11} & 1 \end{bmatrix} \quad \text{(equation 35)}$$

It is noted that the effect of this approximation only impacts the constant out front—thus even if there is a small error it impacts signal and interference terms equally.

In general, the system operates on estimates of the channel parameters, so:

$$W = \begin{bmatrix} 1 & -\hat{R}_{12}/\hat{R}_{22} \\ -\hat{R}_{21}/\hat{R}_{11} & 1 \end{bmatrix}, \quad \text{(equation 36)}$$

and:

$$\hat{z} = WRy = \begin{bmatrix} 1 & -\hat{R}_{12}/\hat{R}_{22} \\ -\hat{R}_{21}/\hat{R}_{11} & 1 \end{bmatrix} \begin{bmatrix} R_{11} & R_{12} \\ R_{21} & R_{22} \end{bmatrix} y \quad \text{(equation 37)}$$

or: (equation 38)

$$\hat{z} = \begin{bmatrix} R_{11} - \hat{R}_{12}R_{21}/\hat{R}_{22} & R_{12} - \hat{R}_{12}R_{22}/\hat{R}_{22} \\ R_{21} - \hat{R}_{21}R_{11}/\hat{R}_{11} & R_{22} - \hat{R}_{21}R_{12}/\hat{R}_{11} \end{bmatrix} y$$

which can be factored as follows:

$$\hat{z} = \begin{bmatrix} R_{11}\left(1 - \frac{\hat{R}_{12}R_{21}}{R_{11}\hat{R}_{22}}\right) & R_{12}\left(1 - \frac{\hat{R}_{12}}{R_{12}}\frac{R_{22}}{\hat{R}_{22}}\right) \\ R_{21}\left(1 - \frac{\hat{R}_{21}}{R_{21}}\frac{R_{11}}{\hat{R}_{11}}\right) & R_{22}\left(1 - \frac{\hat{R}_{21}R_{12}}{\hat{R}_{11}R_{22}}\right) \end{bmatrix} y. \quad \text{(equation 39)}$$

The output signal to interference ratio for channel 1 is given by the ratio of the squared magnitudes of the off diagonal terms to the diagonal terms, i.e., $$SIR_{OUT-CH1} = \frac{|R_{11}|^2 \left|1 - \frac{\hat{R}_{12}R_{21}}{R_{11}\hat{R}_{22}}\right|^2}{|R_{12}|^2 \left|1 - \frac{\hat{R}_{12}}{R_{12}}\frac{R_{22}}{\hat{R}_{22}}\right|^2} \quad \text{(equation 40)}$$

and similarly for channel 2:

$$SIR_{OUT-CH2} = \frac{|R_{22}|^2 \left|1 - \frac{\hat{R}_{21}R_{12}}{\hat{R}_{11}R_{22}}\right|^2}{|R_{21}|^2 \left|1 - \frac{\hat{R}_{21}}{R_{21}}\frac{R_{11}}{\hat{R}_{11}}\right|^2} \quad \text{(equation 41)}$$

The SNR improvement due to the canceller for channel 1 is $$\Gamma^2 = \frac{SIR_{OUT-CH1}}{SIR_{IN-CH1}} = \frac{\left|1 - \frac{\hat{R}_{12}R_{21}}{R_{11}\hat{R}_{22}}\right|^2}{\left|1 - \frac{\hat{R}_{12}}{R_{12}}\frac{R_{22}}{\hat{R}_{22}}\right|^2}, \quad \text{(equation 42)}$$

and for channel 2:

$$\Gamma^2 = \frac{SIR_{OUT-CH2}}{SIR_{IN-CH2}} = \frac{\left|1 - \frac{\hat{R}_{21}R_{12}}{\hat{R}_{11}R_{22}}\right|^2}{\left|1 - \frac{\hat{R}_{21}}{R_{21}}\frac{R_{11}}{\hat{R}_{11}}\right|^2}. \quad \text{(equation 43)}$$

The composite magnitude and phase of the estimates versus the true channel parameters can be combined in a single term to model the effect of the error, i.e., $$\frac{\hat{R}_{12}}{\hat{R}_{22}} = \frac{R_{12}}{R_{22}}\beta e^{j\theta} \quad \text{(equation 44)}$$

where $\beta$ is the magnitude of the reference path (i.e., $\beta = 1 - \epsilon$ where $\epsilon$ is the magnitude error). Therefore the SIR improvement can be simplified as $$\Gamma^2 = \frac{\left|1 - \frac{R_{12}R_{21}}{R_{11}R_{22}}\beta e^{j\theta}\right|^2}{|1 - \beta e^{j\theta}|^2} \quad \text{(equation 45)}$$

and since:

$$\frac{R_{11}}{R_{12}} = \sqrt{SIR_{IN-CH1}} \quad \text{(equation 46)}$$

$$\frac{R_{22}}{R_{21}} = \sqrt{SIR_{IN-CH2}}$$

$$\Gamma^2 = \frac{\left|1 - \frac{1}{\sqrt{SIR_{IN-CH1}}\sqrt{SIR_{IN-CH2}}}\beta e^{j\theta}\right|^2}{|1 - \beta e^{j\theta}|^2}$$

At lower input SIR, the desired signal itself is partially cancelled, degrading the cancellation improvement. At high input SIR, the cancellation improvement is approximately:

$$\Gamma^2 (\text{high input } SIR) = \frac{1}{|1 - \beta e^{j\theta}|^2}$$

Automatic Level Control

Automatic level control (ALC) can be used on satellite links to maintain constant downlink power in order to mitigate the effects of a fading uplink due to rain fade, antenna tracking offsets, etc. ALC changes the channel gain (the gain between the satellite uplink antenna output and the satellite downlink antenna input). The ALC gain will therefore need to be included as a factor in the channel matrix used by the system and the channel matrix will need to be dynamically updated in accordance with ALC gain changes.

ALC could be applied either before or after the canceller processing (i.e., the post-compensation and pr-compensation processing). If applied before the post-compensation, the received channel matrix R (which includes the section of the link between the satellite uplink antenna input and the post-compensation section 210 output) will need to be updated dynamically because it changes the uplink gain before the canceller. This will affect all three cancellation modes: uplink (post-compensation), downlink (pre-compensation), and combined. If applied after the canceller processing, the transmit channel matrix T (which includes the section of the link between the post-compensation section 210 output and the satellite downlink antenna output) will need to be updated dynamically. This will affect two cancellation modes: downlink and combined.

Factors that Affect the Co-Channel Interference Cancellation

[Variation of Signal-to-Interference Ratio (SIR) Improvement Versus Gain and Phase Error]

Previous examples of co-channel interference cancellation (e.g., the embodiment described with respect to FIG. 4) assume the ideal or perfect cancellation situation were the interference signal is completely eliminated.

Figure 9A:
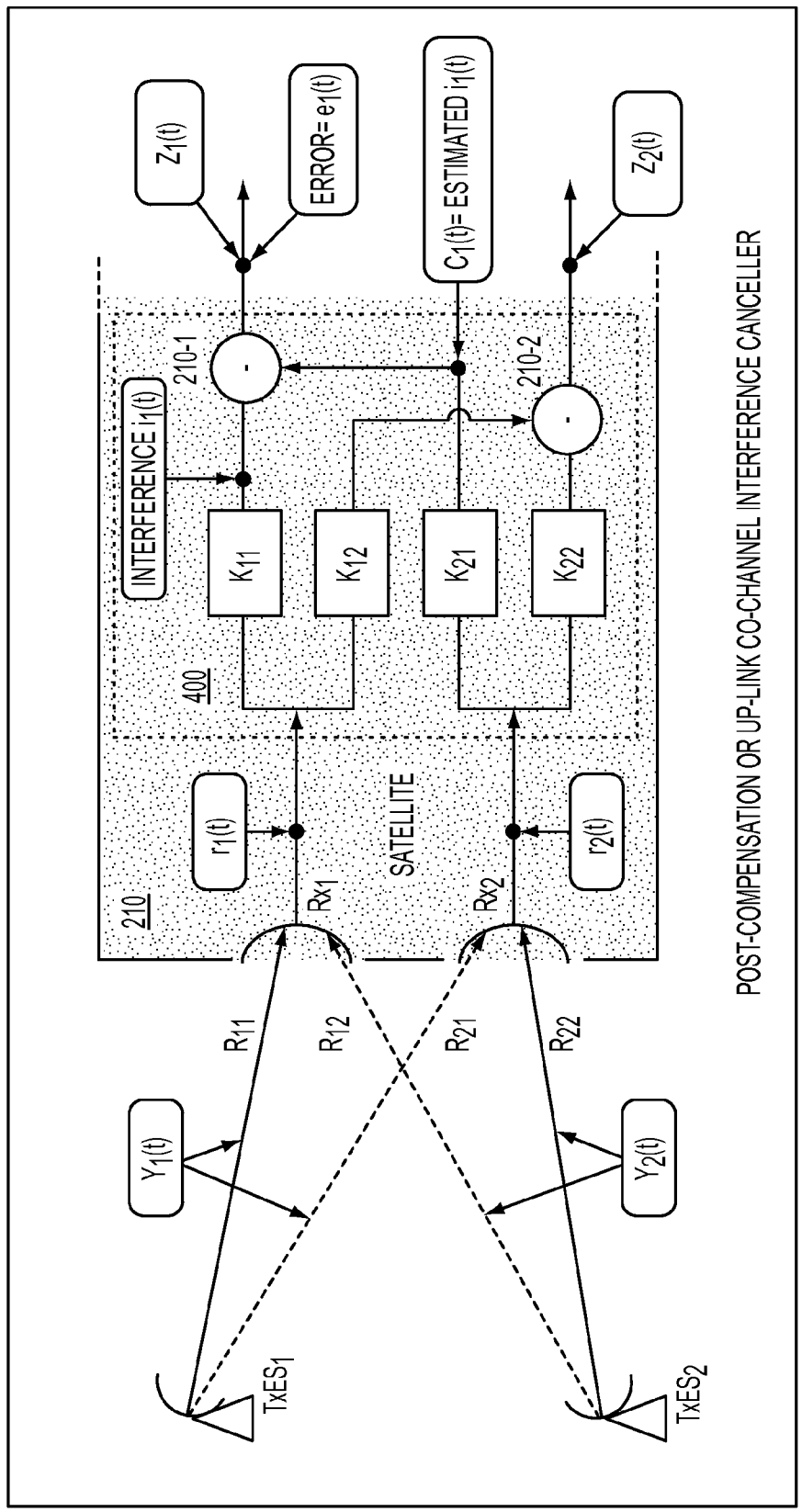
FIG. 9A illustrates a post-compensation section of the co-channel interference canceling system in which the estimated post-compensation signal is not equal to the interference signal, according to an exemplary embodiment of the present invention.

FIG. 9A illustrates a post-compensation section of the co-channel interference canceling system in which the estimated post-compensation signal is not equal to the interference signal, according to an exemplary embodiment of the present invention.

For example, in the up-link post-compensation embodiment show in FIG. 9A, the error signal $e_1(t)$ at the output of the subtraction unit 210-1, which is the difference between the interference component $i_1(t)$ included in the received signal and the estimated interference cancellation signal $c_1(t)$, is not relatively low (in the FIG. 4 embodiment, this error signal $e_1(t)$ is assumed to be relatively low). As such, with respect to the FIG. 9A embodiment of the post-compensation section, the dependences of the canceller performance called "canceller gain" when the error signal $e_1(t)$ is not relatively low are evaluated and disclosed.

Assumed a narrowband approximation,—to ignore the group delay effect—the cancellation signal c1(t) arrives to the subtraction point as a copy of the interference signal with certain gain and phase error. Then we can model the error as:

$$\tilde{e}(t) = \tilde{\iota}(t) - \tilde{c}(t) = \tilde{\iota}(t) - \beta e^{j(\omega_c \tau + \phi_e)} \tilde{\iota}(t-\tau) \text{ or:}$$

$$\tilde{e}(t) \approx \tilde{\iota}(t)[1 - \beta e^{j(\omega_c \tau + \phi_e)}]$$

Figure 9B:
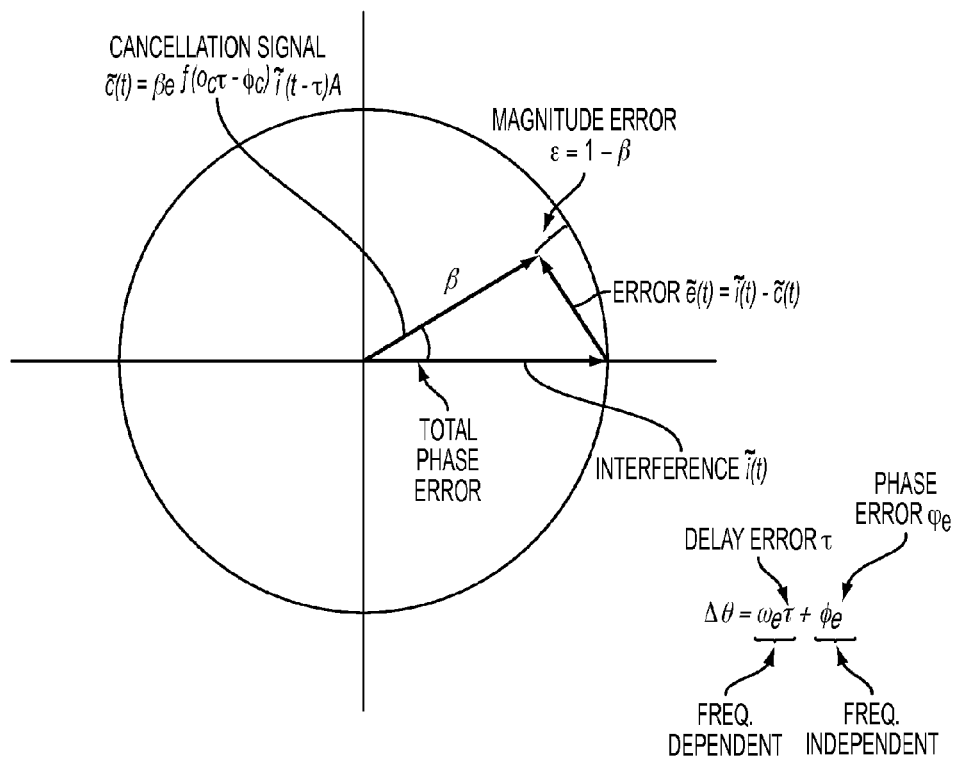
FIG. 9B illustrates the effect of the phase error on the co-channel interference cancellation in the embodiment shown in FIG. 9A.

Accordingly, as shown in FIG. 9B, the cancellation gain introduced by the system could be expressed and computed as:

$$\text{Cancellation Gain} = \frac{|\tilde{i}(t)|^2}{|\tilde{e}(t)|^2} = \frac{|\tilde{i}(t)|^2}{|\tilde{i}(t)|^2 |1 - \beta e^{j\theta(\omega_c \tau + \phi_e)}|^2} = \frac{1}{|1 - \beta e^{j\theta(\omega_c \tau + \phi_e)}|^2}$$

were the dependency of the canceller gain as function of the phase and gain error between the signal object of correction—the interference—, and the estimated interference signal is revealed.

Specifically, FIG. 9B illustrates the previous equation and the effect of the phase error on the co-channel interference/cancellation. Regardless of whether the signal requires only post-compensation, pre-compensation, or combined up and downlink cancellation, the phase error arises from the following two mechanisms:

a) There is a phase error term, due to the local oscillator(s) or due to phase shift across the satellite antenna beams, for example.

b) There is also phase error from a frequency dependent term (akin to a multipath signal) due to delay differences between the signal paths in the different satellite channels; this term is described by $e^{j2\pi f\tau}$ where f is the operating frequency of the canceller and $\tau$ is the delay difference between the channels in the satellite.

Since this term increases with frequency, it may be advantageous to perform the minimization/cancellation at a relatively low intermediate frequency (IF) such as L-band, e.g., 1 GHz. This means the total phase error will be: $\phi = \theta + e^{j2\pi f\tau}$ where $e^{j2\pi f\tau}$ is the delay term and $\theta$ is the phase error term. In an applied mathematical model, the phase error would be represented as the sum of the two terms, i.e., there is a single value for phase error (the two terms are not broken out separately). Due to this dependency on phase error, the transponder local oscillators may need to be phase-locked; otherwise the cancellation will be degraded. Group delay was not modeled; it is assumed that the group delay is relatively constant across the signal bandwidth.

According to the previous analysis the phase error is the parameter that most affects the cancellation gain, gain error have a secondary importance. In conclusion, embodiments of this method must include a precise control of phase and gain errors in order to achieve the maximum possible cancellation gain.

FIG. 6A illustrates the phase dependency for a gain error of 0.5 dB obtained in an applied mathematical model. The figure predicts an improvement of more than 10 dB from the initial SIR of 10 dB if the phase error is limited to less than 15 degrees. It represents more than 100% improvement in the beam to beam isolation.

Effect of Frequency Offset

Figure 10:
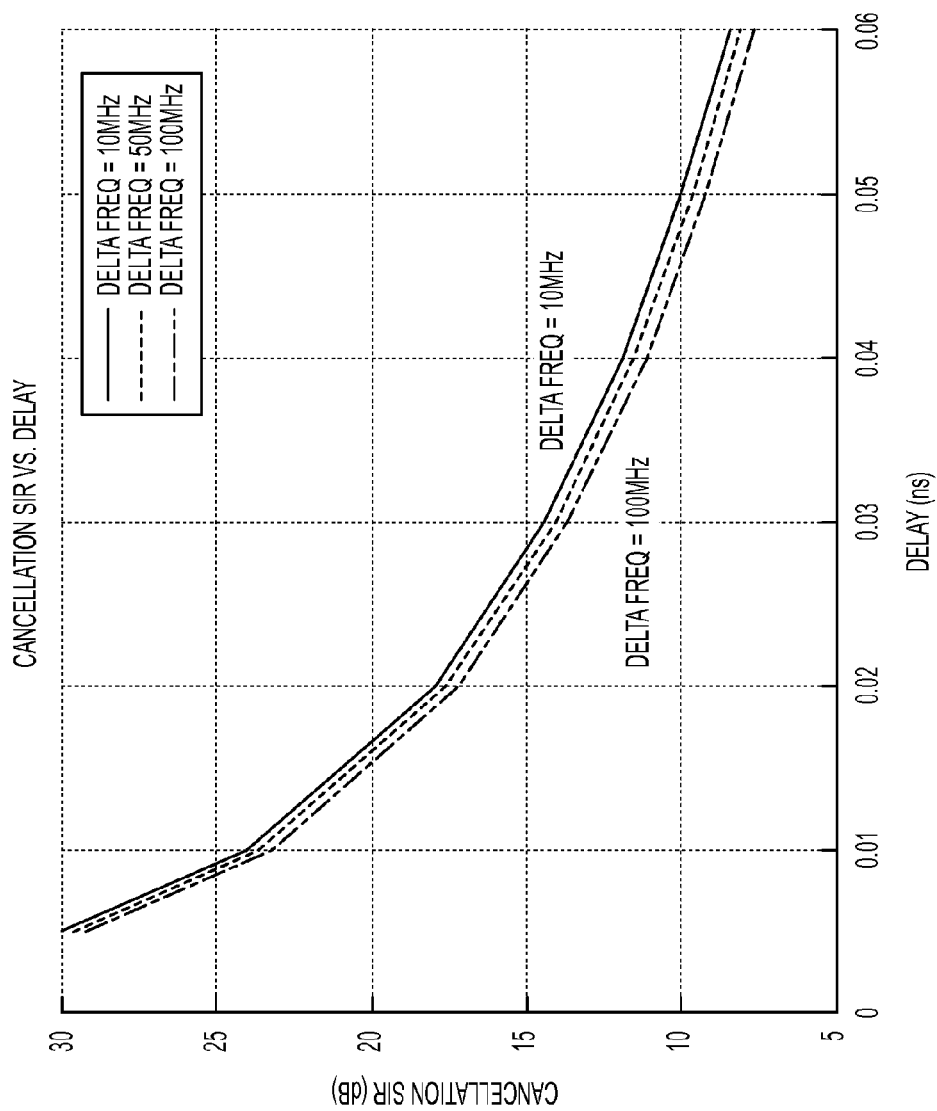
FIG. 10 illustrates the effect of delay and frequency offset upon the minimization/cancellation SIR, in one exemplary embodiment.

FIG. 10 shows the effect of delay and frequency offset upon the minimization/cancellation SIR. The nominal signal center frequency is 1 GHz. The frequency offsets are 10, 50, and 100 MHz. This demonstrates that there is very little variation with frequency offset because the offsets are small compared to the nominal center frequency.

The figure was produced by evaluating the equation:

$$SIR(dB) = -20 \log_{10}|1 - \beta e^{j(\Delta\omega\tau + \phi)}|,$$

where $\beta$ is the gain error, $\Delta\omega$ is the frequency offset, $\tau$ is the delay, and $\phi$ is the phase offset. The gain and phase error were set to 0 and the delay was varied.

Variation of the Signal to Noise Ratio (SNR) at the Canceller

The variation of the SNR due to the presence of the canceller is a consequence of the addition of the scaled cancellation signals (and their associated up-link noise) to the signals in the desired channel.

For analysis purposes, a 2-channel case is assumed as discussed above with channel 1 being the desired channel. Let $$SNR_1 = \frac{S_1}{N_1}$$

and $$SNR_2 = \frac{S_2}{N_2}$$

be the signal-to-noise ratios of the channels before the $N_2$ minimizer/canceller. The sum of the signal and noise powers in the channels are given by $S_1 + N_1$ and $S_2 + N_2$.

Figure 11:
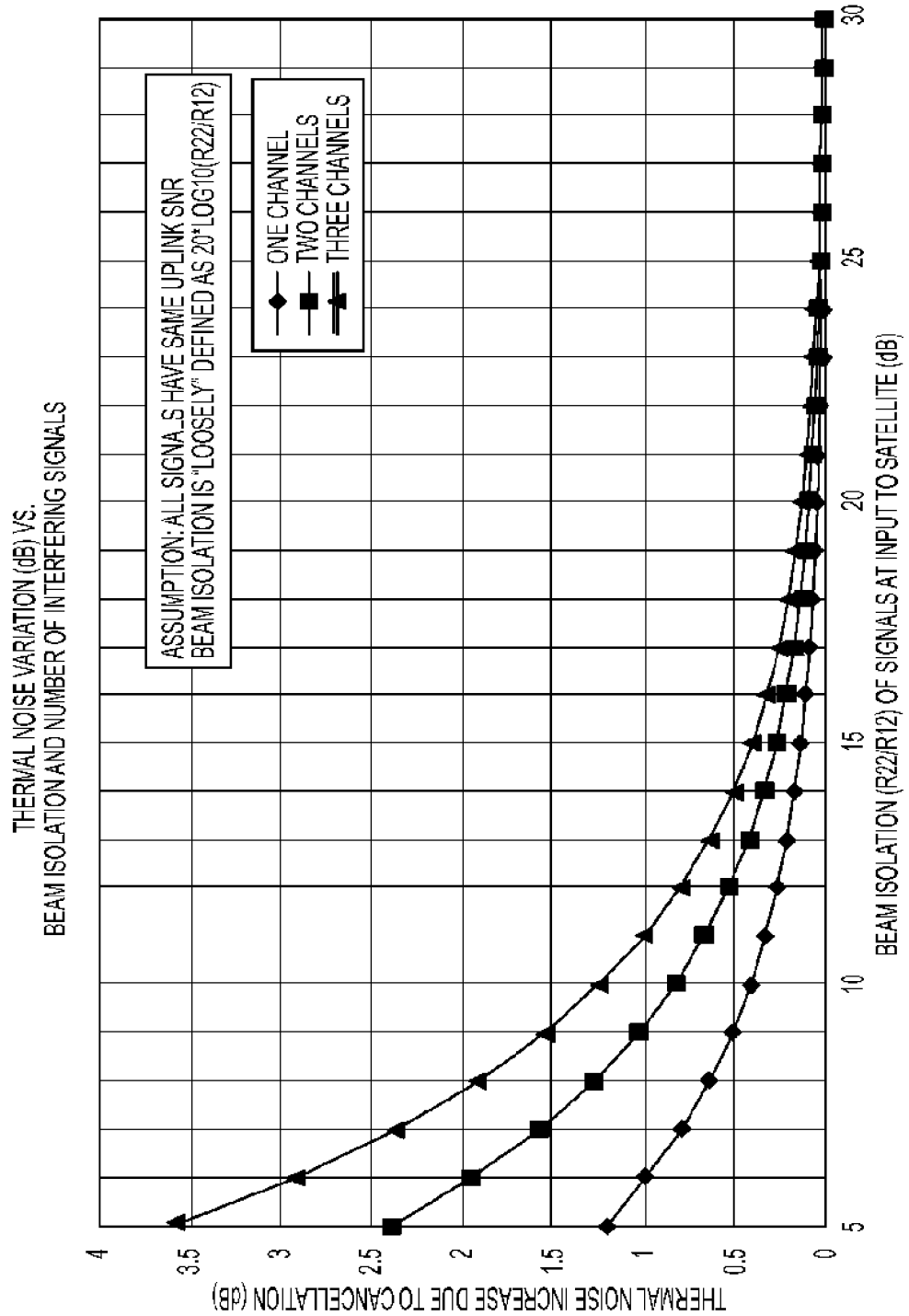
FIG. 11 illustrates the variation of the SNR after the canceller, as a function of the number of co-frequency beams and beam isolation.

FIG. 11 illustrates the effect of uplink SNR at the canceller input for one, two, and three interfering channels.

In FIG. 11, the cancellation signal and the noise from channel 2 into channel 1 is scaled by the channel matrix coefficient $$\frac{R_{12}}{R_{22}}$$

(which is related to the isolation between the two uplink satellite beams) and added to the noise in channel 1.

This gives a signal to noise ratio for signal 1 at the canceller input:

$$SNR'_1 = \frac{S_1}{N_1 + \left(\frac{R_{12}}{R_{22}}\right)^2 N_2} = \frac{SNR_1 N_1}{N_1 + \left(\frac{R_{12}}{R_{22}}\right)^2 N_2}$$

For illustrative purposes, it is assumed that the noise levels in the two channels before the canceller are equal, i.e., $N_1 = N_2$. Thus, $$SNR'_1 = \frac{SNR_1 N_1}{N_1 \left[1 + \left(\frac{R_{12}}{R_{22}}\right)^2\right]} = \frac{SNR_1}{\left[1 + \left(\frac{R_{12}}{R_{22}}\right)^2\right]}$$

The degradation in SNR is then:

$$\Delta SNR = \frac{1}{1 + \left(\frac{R_{12}}{R_{22}}\right)^2},$$

which (in dB) is $$10\log_{10}\left[1+\left(\frac{R_{12}}{R_{22}}\right)^2\right].$$

The above derivation assumes a single interfering channel. If there are multiple interfering channels, the noise will increase by the above amount for each channel. For example, if there are two interfering channels, the noise increase (in dB) will double.

Other Effects

Effects such as propagation events that affect only signal level, e.g., signal fading, scintillation, earth station EIRP fluctuations or small tracking errors will not, in general, affect the minimization/cancellation performance. The signal level into the desired and interfering channels will change by the same amount. On the other hand, events which change the polarization isolation, such as Faraday rotation, rain fade (at C-band), and larger earth station tracking errors, will affect the minimization/cancellation between cross-polarized satellite beams. The degradation will be the same as if a gain or phase error is present.

Figure 12:
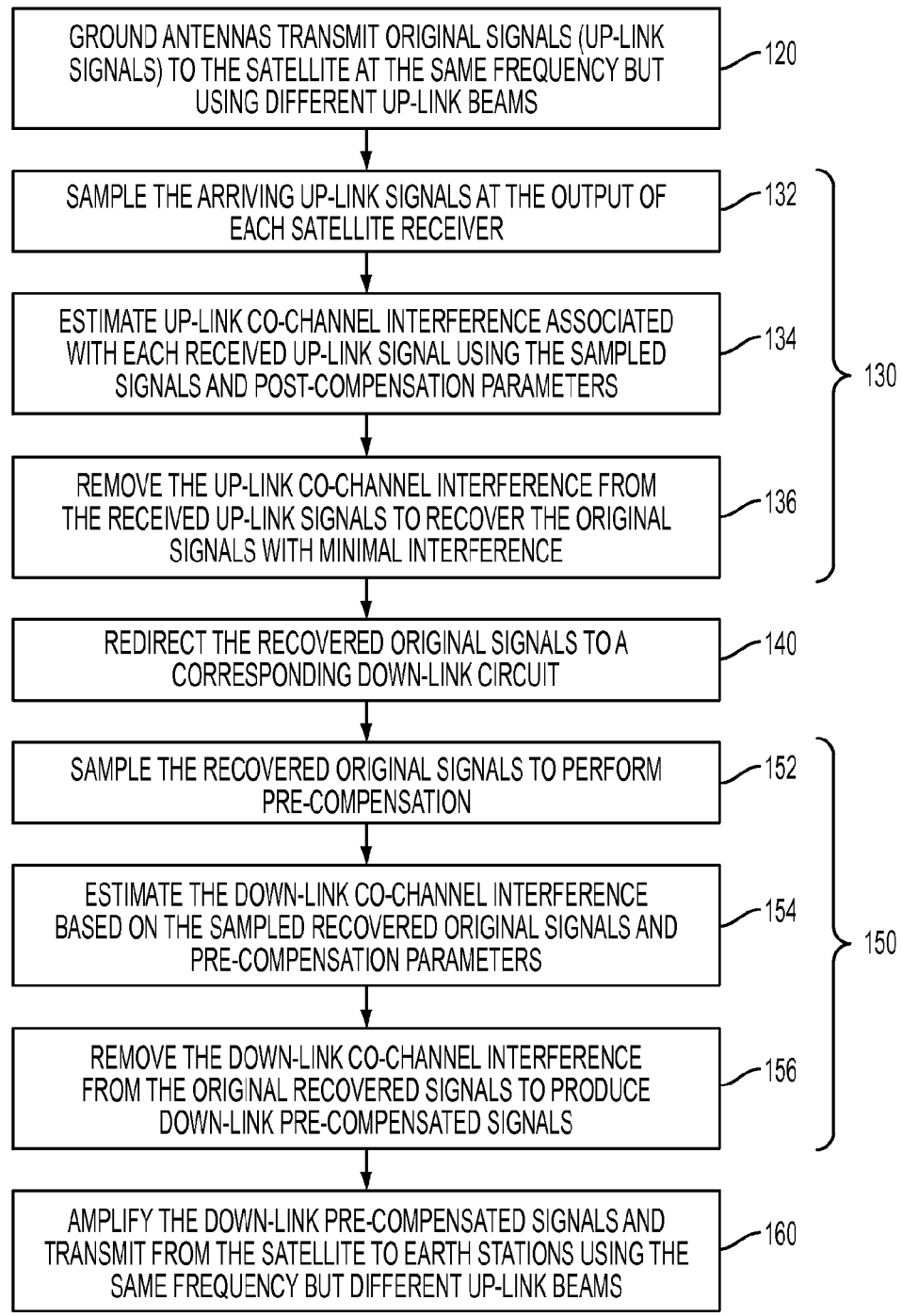
FIG. 12 illustrates a method for canceling co-channel interference, employed on-board a satellite, according to an exemplary embodiment of the present invention.

FIG. 12 illustrates a method for canceling co-channel interference, employed on-board a satellite, according to an exemplary embodiment of the present invention.

Initially, ground antennas transmit original signals to the satellite 20 at the same frequency but using different up-link beams (operation 120). These are the up-link signals.

Due to the imperfect satellite up-link beam isolation, the up-link signals are received by multiple up-link beams with different levels. As such, a combination of both desired and undesired (interfering) signals are present at each satellite receiver.

The post-compensation process is carried out in operation 130, which includes operations 132, 134, and 136. In operation 132, samples of the arriving signals are taken at the output of each satellite receiver to accomplish the post-compensation. Using the sampled signals and the post-compensation parameters discussed above, the up-link co-channel interference associated with each signal is estimated (operation 134). Then, the estimated up-link co-channel interference is removed from the received signals (e.g., by using the subtractive or multiplicative model discussed above) to recover the original signals with minimal interference (operation 136).

The satellite switch redirects the recovered original signals (i.e., the up-link signals from which the up-link co-channel interference is removed) to corresponding down-link circuits (operation 140).

As an option, the co-channel interference cancellation processing can end at operation 136—i.e., the recovered original signals do not undergo the pre-compensation process carried out in operations 150 described below.

Next, the pr-compensation process is described as shown in operation 150, which includes operations 152, 154, and 156. In operation 152, the recovered original signals are sampled to perform the pr-compensation. Based on the sampled recovered original signals and the pre-compensation parameters, the down-link co-channel interference is estimated (operation 154). Then, the estimated down-link co-channel interference is removed from the original recovered signals (e.g., by using the subtractive or multiplicative model discussed above) to produce the down-link pre-compensated signals (operation 156).

Subsequently, at operation 160, the pro-compensated down-link signals are amplified by amplifiers (e.g., $A_1/A_2$ in FIG. 5A) and transmitted from the satellite to the earth stations using the same frequency but different down-link beams. As a consequence of the down-link co-channel interference at the receiver earth station, the pro-compensated signals interfere to recover the original signal with minimum associated interference.

Another option may be to have signals only undergo the pro-compensation processing of operation 150 without first undergoing the post-compensation processing of operation 130.

The systems and methods described above for minimizing/canceling co-channel interference compensate for lower satellite antenna beam to beam isolation resulting in at least the following benefits:

(1) Less critical satellite antenna designs
(2) Closer spacing of co-channel beams which can mean more frequency re-use
(3) Improved Carrier/Noise plus Interference ratios due to reduction in co-channel interference allowing the use of higher order modulation methods resulting in greater throughput
(4) Or combinations of the above.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method for minimizing co-channel interference on-board a satellite, the method comprising:
post-compensating of an up-link signal received by the satellite, the up-link signal comprising a desired signal transmitted by a first transmitter and an interfering signal transmitted by a second transmitter, the post-compensating comprising:
identifying the interfering signal based on post-compensation parameters including locations of the first transmitter and the second transmitter, carrier power levels of the desired signal and the interfering signal, and satellite antenna characteristics;
determining gain relations between a satellite receiver antenna gain in a direction of the first transmitter and a satellite receiver antenna gain in a direction of the second transmitter;
sampling and scaling the interfering signal at the satellite based on the determined gain relations; and
estimating, based on the sampled and scaled interfering signal, a co-channel up-link interference component in the up-link signal,
wherein the post-compensated up-link signal is represented by $Z_1(t)=[\text{Delta}R/R_{22}]\cdot Y_1(t)$, where $\text{Delta}R=(R_{11}\cdot R_{22}-R_{12}\cdot R_{21})$, $Y_1(t)$ is the desired signal transmitted by the first transmitter, R11 is the satellite receiver antenna gain in the direction of the first transmitter, R12 is the satellite receiver antenna gain in the direction of the second transmitter, R22 is an antenna gain of another satellite receiver in the direction of the second transmitter, and R21 is an antenna gain of the other satellite receiver in the direction of the first transmitter.

2. The method of claim 1, wherein the post-compensating further comprises:
subtracting the estimated co-channel up-link interference component from the up-link signal.

3. The method of claim 1, wherein the post-compensating further comprises:
multiplying a weight factor associated with the estimated co-channel up-link interference component with the up-link signal.

4. The method of claim 1, wherein the post-compensation parameters are stored in a database, wherein the post-compensation parameters are dynamically updated in response to changes in at least one of terrestrial networks, satellite configuration, or carrier operational parameters.

5. A method for minimizing co-channel interference on-board a satellite, the method comprising:
pre-compensating of a down-link signal to be transmitted from the satellite to a receiver, the down-link signal transmitted from a first satellite transmitter antenna and an interfering signal, which interferes with the down-link signal, transmitted from a second satellite transmitter antenna, the pre-compensating comprising:
determining gain relations between a gain of the first satellite transmitter antenna in a direction of the receiver and a gain of the second satellite transmitter antenna in the direction of the receiver;
sampling and scaling interfering signals at the satellite based on the determined gain relations; and
estimating a co-channel down-link interference component that the down-link signal is expected to experience on a path to the receiver,
wherein the pre-compensated down-link signal is represented by:

$$S_1(t)=[\text{Delta}T/T_{22}]\cdot Z_1(t),$$

where $Z_1(t)$ is an up-link signal or a signal resulting from a previous post-compensation process and DeltaT= $(T_{11}\cdot T_{22}-T_{12}\cdot T_{21})$,
T11 is the gain of the first satellite transmitter antenna in the direction of the receiver, T21 is the gain of the second satellite transmitter antenna in the direction of the receiver, T12 is a gain of the first satellite transmitter antenna in a direction of another receiver, and T22 is the gain of the second satellite transmitter antenna in the direction of the other receiver.

6. The method of claim 5, wherein the pre-compensating further comprises:
subtracting the estimated co-channel downlink interference component from the down-link signal.

7. The method of claim 5, wherein the pre-compensating further comprises:
multiplying a weight factor associated with the estimated co-channel downlink interference component with the down-link signal.

8. A method for minimizing co-channel interference on-board a satellite, the method comprising:
post-compensating of an up-link signal received by the satellite, the up-link signal comprising a desired signal transmitted by a first transmitter and an interfering signal transmitted by a second transmitter, the post-compensating comprising:
identifying the interfering signal based on post-compensation parameters including locations of the first transmitter and the second transmitter, carrier power levels of the desired signal and the interfering signal, and satellite antenna characteristics;
determining gain relations between a satellite receiver antenna gain in a direction of the first transmitter and a satellite receiver antenna gain in a direction of the second transmitter,
sampling and scaling the interfering signal at the satellite based on the determined gain relations; and
estimating, based on the sampled and scaled interfering signal, a co-channel up-link interference component in the up-link signal; and
pre-compensating of a down-link signal to be transmitted from the satellite to a receiver, the down-link signal transmitted from a first satellite transmitter antenna and an interfering signal, which interferes with the down-link signal, transmitted from a second satellite transmitter antenna, the pre-compensating comprising:
determining gain relations between a gain of the first satellite transmitter antenna in a direction of the receiver and a gain of the second satellite transmitter antenna in the direction of the receiver;
sampling and scaling interfering signals at the satellite based on the determined gain relations; and
estimating a co-channel down-link interference component that the down-link signal is expected to experience on a path to the receiver,
wherein the post-compensated up-link signal is represented by $$Z_1(t)=[\text{Delta}R/R_{22}]\cdot Y_1(t),$$

where DeltaR=$(R_{11}\cdot R_{22}-R_{12}\cdot R_{21})$
$Y_1(t)$ is the desired signal transmitted by the first transmitter, R11 is the satellite receiver antenna gain in the direction of the first transmitter, R12 is the satellite receiver antenna gain in the direction of the second transmitter, R22 is an antenna gain of another satellite receiver in the direction of the second transmitter, and R21 is an antenna gain of the other satellite receiver in the direction of the first transmitter.

9. The method of claim 8, wherein the post-compensating further comprises:
subtracting the estimated co-channel up-link interference component from the up-link signal.

10. The method of claim 8, wherein the post-compensating further comprises:
multiplying a weight factor associated with the estimated co-channel up-link interference component with the up-link signal.

11. The method of claim 8, wherein the post-compensation parameters are stored in a database, wherein the post-compensation parameters are dynamically updated in response to changes in at least one of terrestrial networks, satellite configuration, or carrier operational parameters.

12. The method of claim 8, wherein the pre-compensating further comprises:
subtracting the estimated co-channel downlink interference component from the down-link signal.

13. The method of claim 8, wherein the pre-compensating further comprises:
multiplying a weight factor associated with the estimated co-channel downlink interference component with the down-link signal.

14. A method for minimizing co-channel interference on-board a satellite, the method comprising:
post-compensating of an up-link signal received by the satellite, the up-link signal comprising a desired signal transmitted by a first transmitter and an interfering signal transmitted by a second transmitter, the post-compensating comprising:

identifying the interfering signal based on post-compensation parameters including locations of the first transmitter and the second transmitter, carrier power levels of the desired signal and the interfering signal, and satellite antenna characteristics; and pre-compensating of a down-link signal to be transmitted from the satellite to a receiver, the down-link signal transmitted from a first satellite transmitter antenna and an interfering signal, which interferes with the down-link signal, transmitted from a second satellite transmitter antenna, the pre-compensating comprising:

determining gain relations between a gain of the first satellite transmitter antenna in a direction of the receiver and a gain of the second satellite transmitter antenna in the direction of the receiver;

sampling and scaling interfering signals at the satellite based on the determined gain relations; and estimating a co-channel down-link interference component that the down-link signal is expected to experience on a path to the receiver, wherein the pre-compensated down-link signal is represented by:

$$S_1(t) = [\text{Delta}T/T_{22}] \cdot Z_1(t),$$

where $Z_1(t)$ is an up-link signal or a signal resulting from a previous post-compensation process and $\text{DeltaT} = (T_{11} \cdot T_{22} - T_{12} \cdot T_{21})$, T11 is the gain of the first satellite transmitter antenna in the direction of the receiver, T21 is the gain of the second satellite transmitter antenna in the direction of the receiver, T12 is a gain of the first satellite transmitter antenna in a direction of another receiver, and T22 is the gain of the second satellite transmitter antenna in the direction of the other receiver.

15. A system for minimizing co-channel interference on-board a satellite, the system comprising:

a post-compensation unit which post-compensates an up-link signal received by the satellite, the up-link signal comprising a desired signal transmitted by a first transmitter and an interfering signal transmitted by a second transmitter, wherein the post-compensation unit post-compensates the up-link signal by identifying the interfering signal based on post-compensation parameters including locations of the first transmitter and the second transmitter, carrier power levels of the desired signal and the interfering signal, and satellite antenna characteristics, wherein the post-compensation unit comprises:

a determination unit which determines gain relations between a satellite receiver antenna gain in a direction of the first transmitter and a satellite receiver antenna gain in a direction of the second transmitter;

a sampling unit which samples and scales the interfering signal at the satellite based on the determined gain relations; and an estimating unit which estimates, based on the sampled and scaled interfering signal, a co-channel up-link interference component in the up-link signal, wherein the post-compensation unit represents the post-compensated up-link signal by $$Z_1(t) = [\text{Delta}R/R_{22}] \cdot Y_1(t),$$

where $\text{DeltaR} = (R_{11} \cdot R_{22} - R_{12} \cdot R_{11})$, $Y_1(t)$ is the desired signal transmitted by the first transmitter, R11 is the satellite receiver antenna gain in the direction of the first transmitter, R12 is the satellite receiver antenna gain in the direction of the second transmitter, R22 is an antenna gain of another satellite receiver in the direction of the second transmitter, and R21 is an antenna gain of the other satellite receiver in the direction of the first transmitter.

16. The system of claim 15, wherein the post-compensation unit further comprises:

a subtracting unit which subtracts the estimated co-channel up-link interference component from the up-link signal.

17. The system of claim 15, wherein the post-compensation unit further comprises:

a multiplication unit which multiplies a weight factor associated with the estimated co-channel up-link interference component with the up-link signal.

18. The system of claim 15, wherein the post-compensation parameters are stored in a database, wherein the post-compensation parameters are dynamically updated in response to changes in at least one of terrestrial networks, satellite configuration, or carrier operational parameters.

19. A system for minimizing co-channel interference on-board a satellite, the system comprising:

a pre-compensation unit which pre-compensates a down-link signal to be transmitted from the satellite to a receiver, the down-link signal transmitted from a first satellite transmitter antenna and an interfering signal, which interferes with the down-link signal, transmitted from a second satellite transmitter antenna, the pre-compensation unit comprising:

a determination unit which determines gain relations between a gain of the first satellite transmitter antenna in a direction of the receiver and a gain of the second satellite transmitter antenna in the direction of the receiver;

a sampling unit which samples and scales interfering signals at the satellite based on the determined gain relations; and an estimating unit which estimates a co-channel down-link interference component that the down-link signal is expected to experience on a path to the receiver, wherein the pre-compensation unit represents the pre-compensated down-link signal by:

$$S_1(t) = [\text{Delta}T/T_{22}] \cdot Z_1(t),$$

where $Z_1(t)$ is an up-link signal or a signal resulting from a previous post-compensation process and $\text{DeltaT} = (T_{11} \cdot T_{22} - T_{12} \cdot T_{21})$, T11 is the gain of the first satellite transmitter antenna in the direction of the receiver, T21 is the gain of the second satellite transmitter antenna in the direction of the receiver, T12 is a gain of the first satellite transmitter antenna in a direction of another receiver, and T22 is the gain of the second satellite transmitter antenna in the direction of the other receiver.

20. The system of claim 19, wherein the pre-compensation unit further comprises:

a subtracting unit which subtracts the estimated co-channel downlink interference component from the down-link signal.

21. The system of claim 19, wherein the pre-compensating further comprises:

a multiplication unit which multiplies a weight factor associated with the estimated co-channel downlink interference component with the down-link signal.

22. A system for minimizing co-channel interference on-board a satellite, the system comprising:

a post-compensation unit which post-compensates an up-link signal received by the satellite, the up-link signal comprising a desired signal transmitted by a first transmitter and an interfering signal transmitted by a second transmitter, wherein the post-compensation unit post-compensates the up-link signal by identifying the interfering signal based on post-compensation parameters including locations of the first transmitter and the second transmitter, carrier power levels of the desired signal and the interfering signal, and satellite antenna characteristics, wherein the post-compensation unit comprises:
  a determination unit which determines gain relations between a satellite receiver antenna gain in a direction of the first transmitter and a satellite receiver antenna gain in a direction of the second transmitter;
  a sampling unit which samples and scales the interfering signal at the satellite based on the determined gain relations; and
  an estimating unit which estimates, based on the sampled and scaled interfering signal, a co-channel up-link interference component in the up-link signal; and
a pre-compensation unit which pre-compensates a down-link signal to be transmitted from the satellite to a receiver, the down-link signal transmitted from a first satellite transmitter antenna and an interfering signal, which interferes with the down-link signal, transmitted from a second satellite transmitter antenna, the pre-compensation unit comprising:
  a determination unit which determines gain relations between a gain of the first satellite transmitter antenna in a direction of the receiver and a gain of the second satellite transmitter antenna in the direction of the receiver;
  a sampling unit which samples and scales interfering signals at the satellite based on the determined gain relations; and
  an estimating unit which estimates a co-channel downlink interference component that the down-link signal is expected to experience on a path to the receiver,
wherein the post-compensation unit represents the post-compensated up-link signal by $$Z_1(t)=[\text{Delta}R/R_{22}] \cdot Y_1(t),$$

where $\text{Delta}R=(R_{11} \cdot R_{22} - R_{12} \cdot R_{21})$,
$Y_1(t)$ is the desired signal transmitted by the first transmitter, $R_{11}$ is the satellite receiver antenna gain in the direction of the first transmitter, $R_{12}$ is the satellite receiver antenna gain in the direction of the second transmitter, $R_{22}$ is an antenna gain of another satellite receiver in the direction of the second transmitter, and $R_{21}$ is an antenna gain of the other satellite receiver in the direction of the first transmitter.

23. The system of claim 22, wherein the post-compensation unit further comprises:
  a subtracting unit which subtracts the estimated co-channel up-link interference component from the up-link signal.

24. The system of claim 22, wherein the post-compensation unit further comprises:
  a multiplication unit which multiplies a weight factor associated with the estimated co-channel up-link interference component with the up-link signal.

25. The system of claim 22, wherein the post-compensation parameters are stored in a database, wherein the post-compensation parameters are dynamically updated in response to changes in at least one of terrestrial networks, satellite configuration, or carrier operational parameters.

26. The system of claim 22, wherein the pre-compensation unit further comprises:
  a subtracting unit which subtracts the estimated co-channel downlink interference component from the down-link signal.

27. The system of claim 22, wherein the pre-compensating further comprises:
  a multiplication unit which multiplies a weight factor associated with the estimated co-channel downlink interference component with the down-link signal.

28. A system for minimizing co-channel interference on-board a satellite, the system comprising:
  a post-compensation unit which post-compensates an up-link signal received by the satellite, the up-link signal comprising a desired signal transmitted by a first transmitter and an interfering signal transmitted by a second transmitter, wherein the post-compensation unit post-compensates the up-link signal by identifying the interfering signal based on post-compensation parameters including locations of the first transmitter and the second transmitter, carrier power levels of the desired signal and the interfering signal, and satellite antenna characteristics; and
  a pre-compensation unit which pre-compensates a down-link signal to be transmitted from the satellite to a receiver, the down-link signal transmitted from a first satellite transmitter antenna and an interfering signal, which interferes with the down-link signal, transmitted from a second satellite transmitter antenna, the pre-compensation unit comprising:
    a determination unit which determines gain relations between a gain of the first satellite transmitter antenna in a direction of the receiver and a gain of the second satellite transmitter antenna in the direction of the receiver;
    a sampling unit which samples and scales interfering signals at the satellite based on the determined gain relations; and
    an estimating unit which estimates a co-channel downlink interference component that the down-link signal is expected to experience on a path to the receiver,
  wherein the pre-compensation unit represents the pre-compensated down-link signal by:

$$S_1(t)=[\text{Delta}T/T_{22}] \cdot Z_1(t),$$

where $Z_1(t)$ is an up-link signal or a signal resulting from a previous post-compensation process and $\text{Delta}T=(T_{11} \cdot T_{22} - T_{12} \cdot T_{21})$,
$T_{11}$ is the gain of the first satellite transmitter antenna in the direction of the receiver, $T_{21}$ is the gain of the second satellite transmitter antenna in the direction of the receiver, $T_{12}$ is a gain of the first satellite transmitter antenna in a direction of another receiver, and $T_{22}$ is the gain of the second satellite transmitter antenna in the direction of the other receiver.

* * * * *